United States Patent [19]
Vishlitzky et al.

[11] Patent Number: 5,900,009
[45] Date of Patent: May 4, 1999

[54] SYSTEM AND METHOD FOR ACCESSING RECORDS IN A CACHE SLOT WHICH ARE ASSOCIATED WITH A CURRENT OWNER STORAGE ELEMENT OR AT LEAST ONE PREVIOUS OWNER STORAGE ELEMENT

[75] Inventors: Natan Vishlitzky, Brookline; Eitan Bachmat, Hopkinton, both of Mass.

[73] Assignee: EMC Corporation, Hopkinton, Mass.

[21] Appl. No.: 08/821,496

[22] Filed: Mar. 21, 1997

[51] Int. Cl.$^6$ .................................................. G06F 12/00
[52] U.S. Cl. ......................................................... 711/113
[58] Field of Search .................................. 711/113, 121, 711/129, 118

[56] References Cited

U.S. PATENT DOCUMENTS

| | | | |
|---|---|---|---|
| 5,206,939 | 4/1993 | Yanai et al. ................................. | 711/4 |
| 5,265,232 | 11/1993 | Gannon et al. .......................... | 711/124 |
| 5,490,261 | 2/1996 | Bean et al. ................................. | 711/121 |
| 5,530,829 | 6/1996 | Beardsley et al. ....................... | 711/113 |
| 5,680,576 | 10/1997 | Laudon ..................................... | 711/145 |
| 5,682,500 | 10/1997 | Vishlitzky et al. ...................... | 711/113 |
| 5,778,394 | 7/1998 | Galtzur et al. ........................... | 707/205 |

*Primary Examiner*—Tod R. Swann
*Assistant Examiner*—Felix B. Lee

*Attorney, Agent, or Firm*—Richard Jordan; Krish Gupta; John M. Gunther

[57] ABSTRACT

A digital data storage subsystem comprises a cache memory, a digital data store and a host adapter. The cache memory includes a plurality of cache slots, each of which caches digital data from the digital data store for access by the host adapter. The digital data store includes a disk drive, in which data is stored in the form of variable- or fixed-length records. The storage controller identifies one of said data storage sections as constituting a current owner of respective ones of the cache slot, and is responsive to record staging requests to selectively transfer records from the data storage section identified as the owner of said at least one cache slot to said cache slot for caching. In staging records for the current owner, the storage controller may, but need not, over-write records that were previously staged in the cache slot for previous owners. The host adapter is responsive to access requests requesting access to a record such that, if the record for which access is requested is in a cache slot, it can access the record, whether the record's data storage section is the current owner of the cache slot, or one of a predetermined number of previous owners of the cache slot for which the record was not overwritten for a subsequent owner. On the other hand, if the record is not in a cache slot, which may occur if, for example, it has not been staged in a cache slot or it was staged in a cache slot but has been overwritten while the cache slot was owned by a subsequent owner, the host adapter will generate a record staging request for processing by the storage controller.

24 Claims, 19 Drawing Sheets

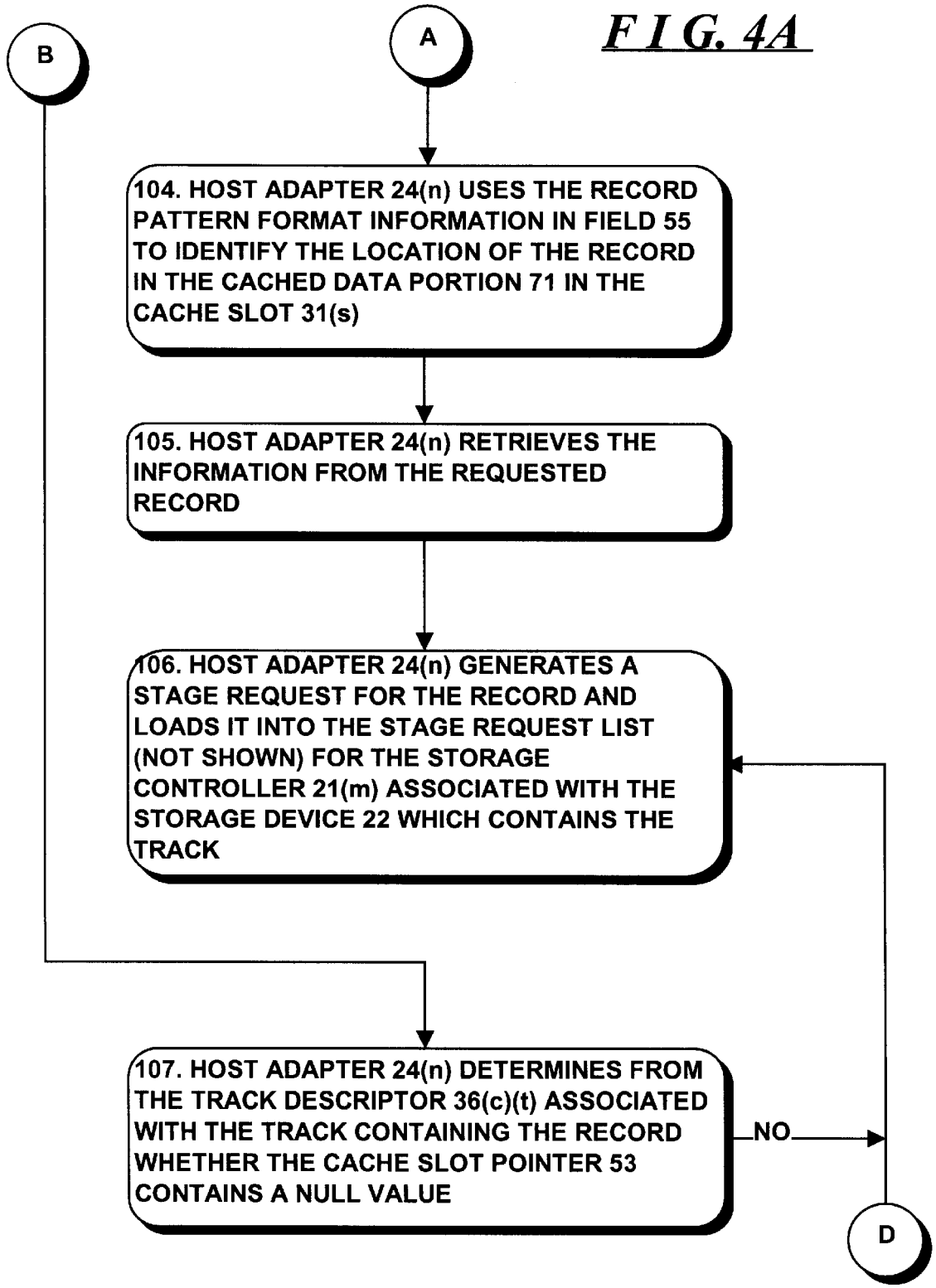

138. HOST ADAPTER 24(n) GENERATES A STAGE REQUEST FOR THE RECORD AND LOADS IT INTO THE STAGE REQUEST LIST (NOT SHOWN) FOR THE STORAGE CONTROLLER 21(m) ASSOCIATED WITH THE STORAGE DEVICE 22 WHICH CONTAINS THE TRACK

157. STORAGE CONTROLLER 21(m) DETERMINES, FOR EACH TRACK IDENTIFIED IN THE FIELDS 75(p) OF THE CACHE SLOT OWNER LIST 75, OTHER THAN THE CURRENT OWNER OF THE CACHE SLOT 31(s), WHETHER THE RECORD STORED IN STEP 155 OVERLAPS ANY RECORDS FROM THE TRACK THAT ARE STORED IN THE CACHE SLOT

158. STORAGE CONTROLLER 21(m) RESETS THE RECORD IN CACHE FLAG(s) 77 IN THE RECORD DESCRIPTORS 76(p)(r) FOR SUCH RECORD(s)

FIG. 6D

164. STORAGE CONTROLLER 21(m) ADVANCES THE WRITE POINTERS 83 AND 83 OF THE TABLES 80 AND 90 TO POINT TO THE RESPECTIVE NEXT FIELD 75(p) AND LIST 76(p) IN THE CACHE SLOT OWNER LIST 75 AND RECORD DESCRIPTOR LIST 76

165. STORAGE CONTROLLER 21(m) CLEARS CACHE SLOT POINTER FIELD 53 OF TRACK DESCRIPTOR 36(c)(t) ASSOCIATED WITH TRACK IDENTIFIED BY CONTENTS OF FIELD 75(p) POINTED TO BY WRITE POINTER 83

166. STORAGE CONTROLLER 21(m) LOADS AN IDENTIFIER IDENTIFYING THE TRACK THAT IS TO BE THE NEW OWNER INTO THE LOCATION IDENTIFIED BY WRITE POINTER 83

FIG. 6E

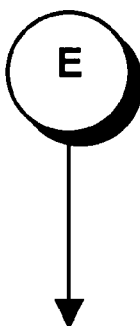

167. STORAGE CONTROLLER 21(m) ESTABLISHES A SLOT OWNER RECORD DESCRIPTOR LIST 76(p) FOR THE TRACK IN THE LOCATION IN THE RECORD DESCRIPTOR LIST 76 IDENTIFIED BY WRITE POINTER 93

168. STORAGE CONTROLLER 21(m) SETS THE TRACK IN CACHE FLAG 52 IN THE TRACK DESCRIPTOR 36(c)(t) ASSOCIATED WITH THE TRACK WHICH IS THE NEW OWNER OF THE CACHE SLOT 31(s)

169. STORAGE CONTROLLER 21(m) LOADS A POINTER TO THE CACHE SLOT 31(s) INTO THE FIELD 53 OF THE TRACK DESCRIPTOR 36(c)(t) ASSOCIATED WITH THE TRACK WHICH IS THE NEW OWNER OF THE CACHE SLOT 31(s)

SYSTEM AND METHOD FOR ACCESSING RECORDS IN A CACHE SLOT WHICH ARE ASSOCIATED WITH A CURRENT OWNER STORAGE ELEMENT OR AT LEAST ONE PREVIOUS OWNER STORAGE ELEMENT

FIELD OF THE INVENTION

The invention relates generally to the field of digital computer systems and more particularly to system and method for efficiently caching information in a digital data storage subsystem for facilitating transfers between a storage medium such as provided by disk storage devices, and a cache memory which caches the data stored on such devices.

BACKGROUND OF THE INVENTION

In modern "enterprise" computing environments, that is, computer systems for use in an office environment in a company, a number of personal computers, workstations, mini-computers and mainframe computers, along with other devices such as large mass storage subsystems, network printers and interfaces to the public telephony system, may be interconnected to provide an integrated environment in which information may be shared among users in the company. Typically, users may be performing a variety of operations, including order receipt, manufacturing, shipping, billing, inventory control, and other operations, in which sharing of data on a real-time basis may provide a significant advantage over, for example, maintaining separate records and attempting to later reconcile them. The users may operate on their own data, which they may maintain on the computers they are using, or alternatively they may share data through the large mass storage subsystems.

One such large mass storage subsystem is described in, for example, U.S. Pat. No. 5,206,939, entitled System And Method For Disk Mapping And Data Retrieval, issued Apr. 27, 1993 to Moshe Yanai, et al (hereinafter, "the '939 patent"), U.S. patent application Ser. No. 07/893,509 filed Jun. 4, 1995, in the name of Moshe Yanai, et al., entitled "System And Method For Dynamically Controlling Cache Management" (hereinafter referred to as "the Yanai patent application"), and U.S. Pat. No. 5,592,432, entitled "Cache Management System Using Time Stamping For Replacement Queue," issued Jan. 7, 1997 in the name of Natan Vishlitzky, et al., all of which are assigned to the assignee of the present invention and incorporated herein by reference. That patent and those applications generally describe an arrangement which allows data, as used by computers, organized in records, with each record being in well-known "CKD" ("count-key-data") format, to be stored in disk storage devices which provide a "fixed block" storage architecture. In this arrangement, a large cache is used to buffer data that is transferred from the storage devices for use by the respective computers, and, if the data has been modified, transferred back from to the storage devices for storage.

SUMMARY OF THE INVENTION

The invention provides a new and improved record-level caching system and method for digital data storage subsystem.

In brief summary, the new digital data storage subsystem comprises a cache memory, a digital data store and a host adapter. The cache memory includes a plurality of cache slots, each of which caches digital data from the digital data store for access by the host adapter. The digital data store includes a plurality of data storage "sections" and a storage controller. Illustratively, if the digital data store stores data in a disk drive, which includes a plurality of tracks, each data storage section will preferably constitute a track. Each track, in turn, stores digital data in the form of variable- or fixed-length records. Illustratively, a track may store data in the form of variable-length CKD records, or fixed-length architecture ("FBA") blocks. The storage controller identifies one of said data storage sections as constituting a current owner of respective ones of the cache slot, and is responsive to record staging requests to selectively transfer records from the data storage section identified as the owner of said at least one cache slot to said cache slot for caching. In staging records for the current owner, the storage controller may, but need not, over-write records that were previously staged in the cache slot for previous owners. The host adapter is responsive to access requests requesting access to a record such that, if the record for which access is requested is in a cache slot, it can access the record, whether the record's data storage section is the current owner of the cache slot, or one of a predetermined number of previous owners of the cache slot for which the record was not overwritten for a subsequent owner. On the other hand, if the record is not in a cache slot, which may occur if, for example, it has not been staged in a cache slot or it was staged in a cache slot but has been overwritten while the cache slot was owned by a subsequent owner, the host adapter will generate a record staging request for processing by the storage controller.

BRIEF DESCRIPTION OF THE DRAWINGS

This invention is pointed out with particularity in the appended claims. The above and further advantages of this invention may be better understood by referring to the following description taken in conjunction with the accompanying drawings, in which:

DETAILED DESCRIPTION OF AN ILLUSTRATIVE EMBODIMENT

Figure 1:
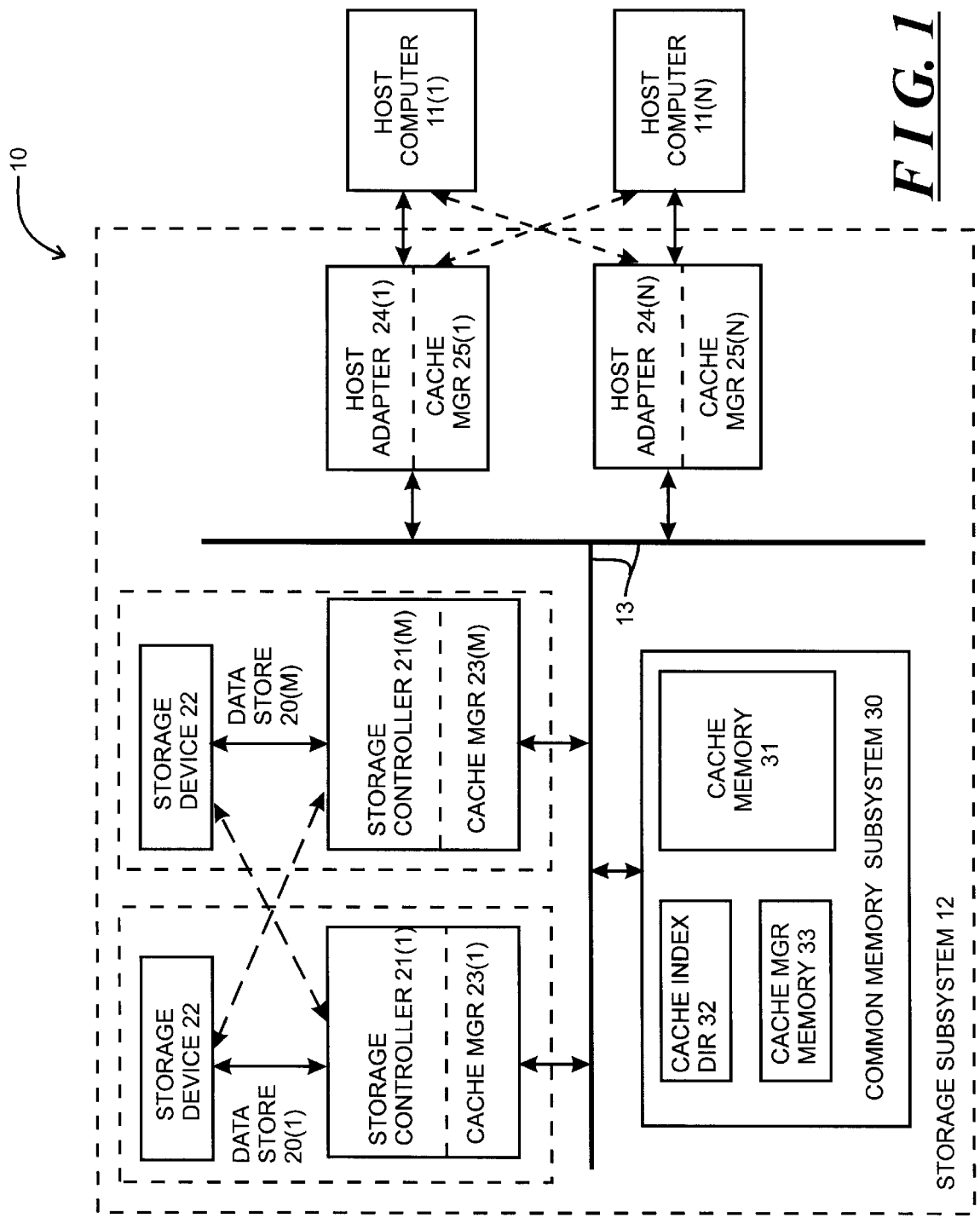
FIG. 1 is a functional block diagram of a digital computer system, including a mass storage subsystem incorporating a record-level caching arrangement in accordance with the invention.

The invention will be described in connection with a digital computer system 10 depicted in functional block diagram form in FIG. 1. With reference to FIG. 1, computer system 10 includes a plurality of host computers 11(1) through 11(N) (generally identified by reference numeral 11(n)) and a digital data storage subsystem 12 interconnected by a bus 13. Each host computer 11(n) may comprise, for example, any of a number of types of conventional computers. In one embodiment, host computers 11(n) generally comprise mainframe computers such as those sold by International Business Machines Corp., although it will be appreciated that the host computers 11(n) may include other types of computers, such as minicomputers, personal computers, workstations, and the like. Each host computer 11(*n*) is connected to an associated host adapter 24(*n*), which, in turn, is connected to bus 13. Each host computer 11(*n*) may control its associated host adapter 24(*n*) to perform a retrieval operation, in which the host adapter 24(*n*) initiates retrieval of computer programs and digital data (generally, "information") from the digital data storage subsystem 12 for use by the host computer 11(*n*) in its processing operations. In addition, the host computer 11(*n*) may control its associated host adapter 24(*n*) to perform a storage operation in which the host adapter 24(*n*) initiates storage of processed data in the digital data storage subsystem 12. Generally, retrieval operations and storage operations in connection with the digital data storage subsystem 12 will collectively be referred to as "access operations."

In connection with both retrieval and storage operations, the host adapter 11(*n*) will transfer access operation command information, together with processed data to be stored during a storage operation, over the bus 13. Access to the bus 13 is controlled by bus access control circuitry which, in one embodiment, is integrated in the respective host adapters 24(*n*). The bus access control circuitry arbitrates among devices connected to the bus 13 which require access to the bus 13. In controlling access to the bus 13, the bus access control circuitry may use any of a number of known bus access arbitration techniques.

The digital data storage subsystem 12 in one embodiment is generally similar to the digital data storage subsystem described in U.S. Pat. No. 5,206,939, entitled System And Method For Disk Mapping And Data Retrieval, issued Apr. 27, 1993 to Moshe Yanai, et al (hereinafter, "the '939 patent"). As shown in FIG. 1, the digital data storage subsystem 12 includes a plurality of digital data stores 20(1) through 20(M) (generally identified by reference numeral 20(*m*)), each of which is also connected to bus 13. Each of the data stores 20(*m*) stores information, including programs and data, which may be accessed by the host computers 11(*n*) as well as processed data provided to the digital data storage subsystem 12 by the host computers 11(*n*).

Each data store 20(*m*), in turn, includes a storage controller 21(*m*) and one or more storage devices generally identified by reference numeral 22. In one embodiment, the storage devices 22 comprise conventional magnetic disk storage devices, although it will be appreciated that they may also include tape storage devices, optical disk storage devices and CD-ROM devices from which information may be retrieved. Each storage controller 21(*m*) connects to bus 13 and controls the storage of information which it receives thereover in the storage devices connected thereto. In addition, each storage controller 21(*m*) controls the retrieval of information from the storage devices 22 which are connected thereto for transmission over bus 13, and in one embodiment includes bus access control circuitry for controlling access to bus 13.

The digital data storage subsystem 12 also includes a common memory subsystem 30 for caching information during an access operation and event status information providing selected status information concerning the status of the host computers 11(*n*) and the data stores 20(*m*) at certain points in their operations. The caching of event status information by the common memory subsystem 30 is described in detail in U.S. patent application. Ser. No. 08/532,240, filed Sep. 22, 1995, in the name of Eli Shagam, et al., and entitled Digital Computer System Including Common Event Log For Logging Event Information Generated By A Plurality of Devices, assigned to the assignee of the present invention and incorporated herein by reference.

The information cached by the common memory subsystem 30 during an access operation includes data provided by a host computer 11(*n*) to be stored on a data store 20(*m*) during a storage operation, as well as data provided by a data store 20(*m*) to be retrieved by a host computer 11(*n*) during a retrieval operation. The common memory subsystem 30 effectively operates as a buffer to buffer information transferred between the host computers and the data stores 20(*m*) during an access operation.

The common memory subsystem 30 includes a cache memory 31, a cache index directory 32 and a cache manager memory 33, which are generally described in U.S. patent application Ser. No. 07/893,509 filed Jun. 4, 1995, in the name of Moshe Yanai, et al., entitled "System And Method For Dynamically Controlling Cache Management," and U.S. Pat. No. 5,592,432, entitled "Cache Management System Using Time Stamping For Replacement Queue," issued Jan. 7, 1997 in the name of Natan Vishlitzky, et al., both of which are assigned to the assignee of the present invention and incorporated herein by reference. The cache memory 31 operates as a buffer in connection with storage and retrieval operations, in particular buffering data received from the host computers 11(*n*) to be transferred to the storage devices for storage, and buffering data received from the data stores 20(*m*) to be transferred to the host computers 11(*n*) for processing.

Figure 2:
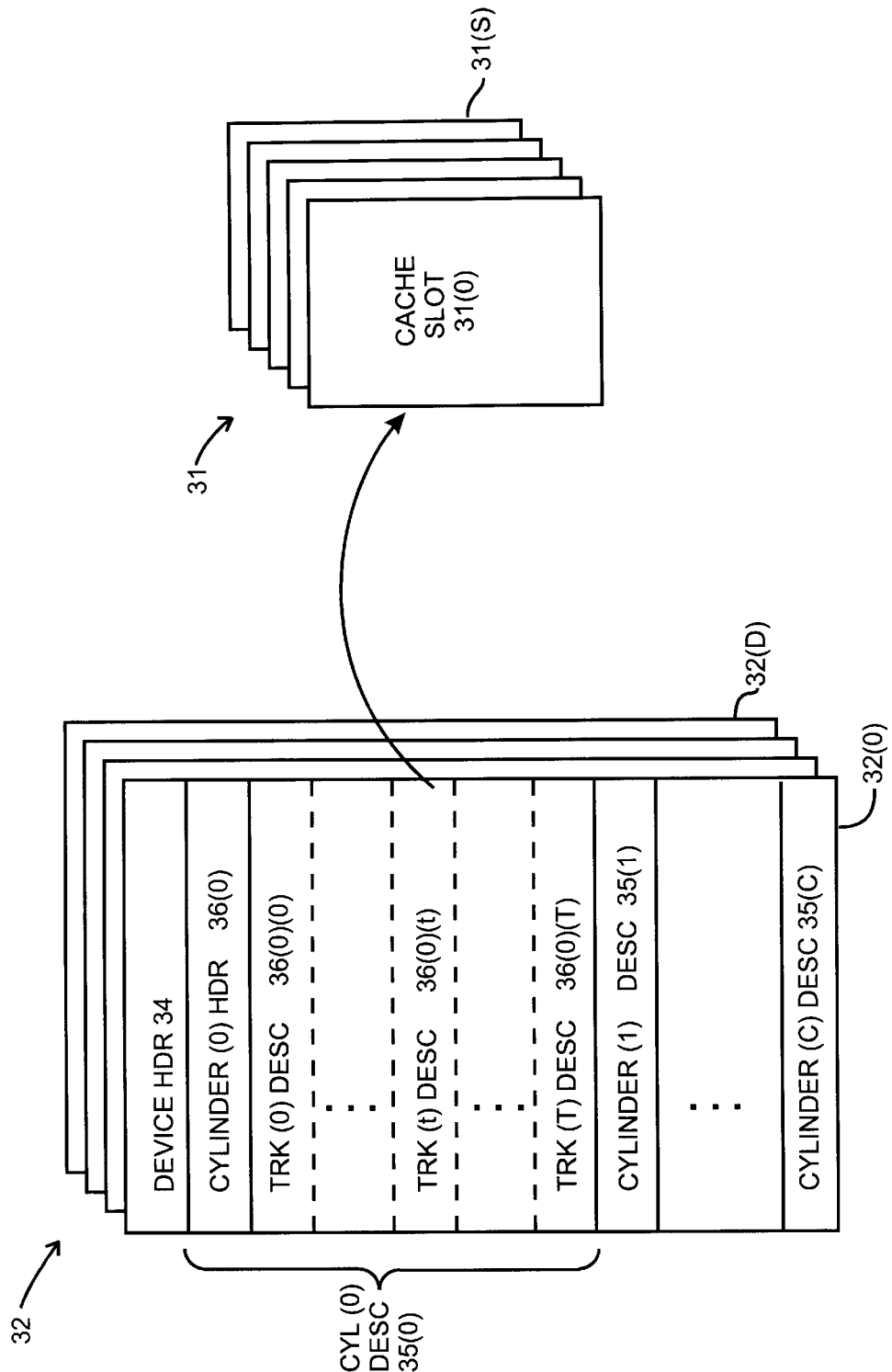
FIG. 2 depicts the organization of a cache memory and cache index directory useful in understanding the operation of the storage subsystem depicted in FIG. 1.

The cache memory 31 and cache index directory 32 will generally be described in connection with FIG. 2. With reference to FIG. 2, the cache memory 31 includes a series of storage locations, which are organized in a series of cache slots 31(0) through 31(S) (generally identified by reference numeral 31(*s*)). The storage locations are, in turn, identified by a series of addresses, with the starting address of a cache slot being identified by a base address. The cache slots 31(*s*), in turn, operate as the cache memory's buffer as described above.

The cache index directory 32 contains information for each of the disk tracks in the storage devices 22. For each of the track from which information is buffered in the cache memory 31, the cache index directory 32 also contains a pointer to the cache slot 31(*s*) in which the information is buffered. The cache index directory 32 includes a plurality of cache index tables 32(0) through 32(D) (generally identified by reference numeral 32(*d*)), each of which is associated with one of the storage devices 22 in the storage subsystem 12. Each cache index table 32(*d*) includes a device header field 34, which provides, for example, selected identification and status information for the device 22 associated with the cache index table 32(*d*). In addition, each cache index table 32(*d*) includes a plurality of cylinder descriptors 35(1) through 35(C) (generally identified by reference numeral 35(*c*)) each of which is associated with one of the cylinders in the storage device 22 that is associated with the cache index table 32(*d*). Each cylinder descriptor 35(*c*), in turn, includes a cylinder header 36(*c*), which provides, for example, selected identification and status information for the cylinder associated with the cylinder descriptor 35(*c*).

In addition, each cylinder descriptor 35(*c*) includes a plurality of track descriptors 36(*c*)(0) through 36(*c*)(T) (generally identified by reference numeral 35(*c*)(*t*)), each of which is associated with one of the tracks in the cylinder 35(*c*). The structure of a track descriptor 36(*c*)(*t*) will be described in detail in connection with FIG. 3. Generally, each track descriptor 36(*c*)(*t*), in turn, includes information for the associated track of the storage device 22, including the number of records on the associated track, formatting information indicating the format of the records on the associated track, and whether any of the records from the track are in the cache memory 31. In addition, if any of the records from the associated track are cached in the cache memory 31, the track descriptor 36(c)(t) includes a plurality of record descriptors providing information as to the records that in the cache memory 31.

Each of the host adapters 24(n) and each of the storage controllers 21(m) includes a cache manager 25(n) and 23(m), respectively, to access to the cache memory 31, cache index directory 32 and cache manager memory 33. The particular operations performed during an access operation will depend on a number of factors, including the access operation to be performed, whether or not the record or records from the particular track to be accessed are cached in the cache memory 31, and whether or not the record(s) contained in a cache slot 31(s) have been modified or updated by a host adapter's cache manager 25(n) during a storage operation. The host adapters 24(n) typically perform storage and retrieval operations in connection with record(s) which are cached in the cache memory 31. If a record from which a host adapter 24(n) is to retrieve information during a retrieval operation, or which is to be updated by a host adapter 24(n) during a storage operation, are not cached in the cache memory 31, the host adapter 24(n) enables the storage controller 21(m) that controls the storage device 22 in which the record is stored perform a "staging" operation to copy the record from the storage device 22 to the cache memory 31 for buffering. During a de-staging operation in connection with a record in a cache slot 31(s) which has been updated by a host computer 11(n), the storage controller 21(m) will copy the updated record from the cache slot 31(s) to the track of the storage device 22 from which it was originally staged.

The cache manager memory 33 maintains a number of work lists (not separately shown) which are used to control operations by the host adapters 24(n) and storage controllers 21(m) during an access operation. In particular, the cache manager memory 33 includes various lists which the host adapters 24(n) and storage controllers 21(m) use to communicate to coordinate staging operations. It will be appreciated that the various lists maintained by the cache manager memory 33 may comprise any of a number of convenient forms, including queues, trees, stacks or the like. The staging operation coordination communication lists include a plurality of stage request lists and a plurality of stage completion lists, with one stage request list being associated with each data store 20(m) and one stage completion list being associated with each host computer 11(n). The host adapters' cache managers 25(m) use the stage request lists to store stage requests to be performed by the respective data stores 20(m), and the data stores' cache managers 23(n) use the stage completion lists to store stage completion messages to indicate to the respective host adapters' cache managers 25(m) that the stage requests have been completed.

The pending write list is used to identify cache slots 31(s) which contain any updated records which have not been written to a storage device. During de-staging operations, the storage controllers' cache managers 23(m) will use the write pending list to identify cache slots to be written to a storage device 22. Preferably, the cache slots 31(s) which are identified in the pending write list will not also be listed in the cache slot replacement list, so that cache slots 31(s) which contain any updated records will not be used until they (the updated record or records) have been written to a storage device through a de-staging operation.

In one embodiment, the cache slots 31(s) which are not identified on the pending write list are organized according to a modified least-recently-used cache slot re-use methodology, such as that described in the aforementioned Shagam patent application, to allow the cache slots to be re-used during a staging operation. Each cache slot 31(s) includes a slot header, which is also described in detail below in connection with FIG. 3, which includes pointers which organize the cache slots 31(s) in a doubly-linked "available cache slot" list in a conventional manner. After all of the updated records in a cache slot 31(s) which is identified on the pending write list have been de-staged, the cache slot 31(s) may thereafter be transferred to the available cache slot list for possible future re-use during a staging operation.

Generally, a host adapter 24(n), during a retrieval operation, during which information is to be retrieved from a record, will attempt to retrieve the information from the cache memory 31. However, if the record from which information is to be retrieved is not in the cache memory 31, it (that is, the host adapter 24(n)) will place a stage request on the stage request list of the storage controller 21(m) which controls the storage device 22 that contains the record(s) to enable it (that is, the storage controller 21(m)) to "stage" the record, which causes the record to be retrieved from the storage device 22 which contains the record and be stored in a cache slot 31(s) in the cache memory 31. The storage controller 21(m) may stage not only the record requested by the host adapter 24(n), but may also perform a prefetch operation in which, for example, subsequent records in the same track of the storage device 22 are retrieved and stored in the cache slot 31(s). The cache slots 31(s) are organized on a track basis, so that all records retrieved from a track of a storage device 22 will be stored in the same cache slot 31(s), and (except as described below) a cache slot 31(s) will normally contain only records from a single track of the storage device 22. It will be appreciated, however, that the storage controllers 21(m) will normally only retrieve and store in the cache slot 31(s) those records which were requested to be retrieved by a host adapter 24(n), as well as records which were prefetched.

After the storage controller has stored the record(s) to be retrieved in a cache slot 31(s) in the cache memory 31, it will place a stage completion notice on the stage completion list associated with the host adapter 24(n) which issued to stage request notice. Thereafter, the host adapter 24(n) can retrieve the information from the cache slot 31(s).

Similarly, during a record update operation, the host adapter 24(n) will determine whether the particular record(s) to be updated are in a slot in the cache memory 31 and if so will update the record(s) in the slot. However, if the record (s) is not in the cache memory 31, the host adapter 24(n) will enable the storage controller 21(m) which controls the storage device 22 that contains the record(s) to be updated to perform a staging operation, thereby to transfer the record(s) in the track into a slot in the cache memory 31. In those operations, the host adapter 24(n) will place a stage request on the stage request list of the storage controller 21(m) which controls the storage device that contains the record(s) to be updated, and after the record(s) have been staged the storage controller 21(m) will place a stage completion notice on the stage completion list associated with the host adapter 24(n) which issued the stage request notice, in the same manner as during a retrieval operation. After the record(s) from the track has been copied into the cache memory 31, the host adapter 24(n) will update the record(s) in the cache slot 31(s), and can transfer the cache slot 31(s) to the write pending list to enable respective storage controller 21(m) to store the updated record(s) on the respective storage device 22.

As described above, during a retrieval operation, a storage controller 21(m) will retrieve from a storage device 22, and load into a cache slot 31(s), one or more records as requested by a host adapter 24(n) into a cache slot 31(s), along with any records which it may prefetch in accordance with a prefetch algorithm. As further described above, all of the records which the storage controller 21(m) will load into particular a cache slot 31(s) are from the same track of the particular storage device 22, and the storage controller 21(m) will load into the cache slot 31(s) only records from the particular track. In storing the record(s) in the cache slot 31(s) from the current "owner" of the cache slot 31(s), that is, from the particular track of the storage device from which the record(s) are obtained during the staging operation, the storage controller 21(m) may over-write portions or entire records stored in the cache slot 31(s) from previous "owners" of the cache slot 31(s).

On the other hand, some or all of the records that were stored in the cache slot from previous owners of the cache slot 31(s) may not be over-written during a staging operation, and instead may still be in the cache slot 31(s), even thought such records' tracks are not the current owners of the cache slot 31(s). In accordance with the invention, as long as a previously-staged record has not been over-written in subsequent staging operations from subsequent owners of the cache slot 31(s), it can be retrieved from the cache slot 31(s) by the respective host adapters 24(n) without requiring a staging operation to make its track the current owner of the cache slot 31(s). Thus, as long as a previously-staged record is still in the cache slot 31(s) in which it was stored during a previous staging operation a host adapter 24(n) can retrieve information therefrom without requiring a new staging operation for the record. In one embodiment, the invention facilitates obtaining records from particular cache slot 31(s), which were associated with a preselected maximum number of tracks which previously owned the cache slot 31(s), provided those records were not overwritten by records stored in the cache slot 31(s) for subsequent owners of the cache slot 31(s).

Figure 3A:
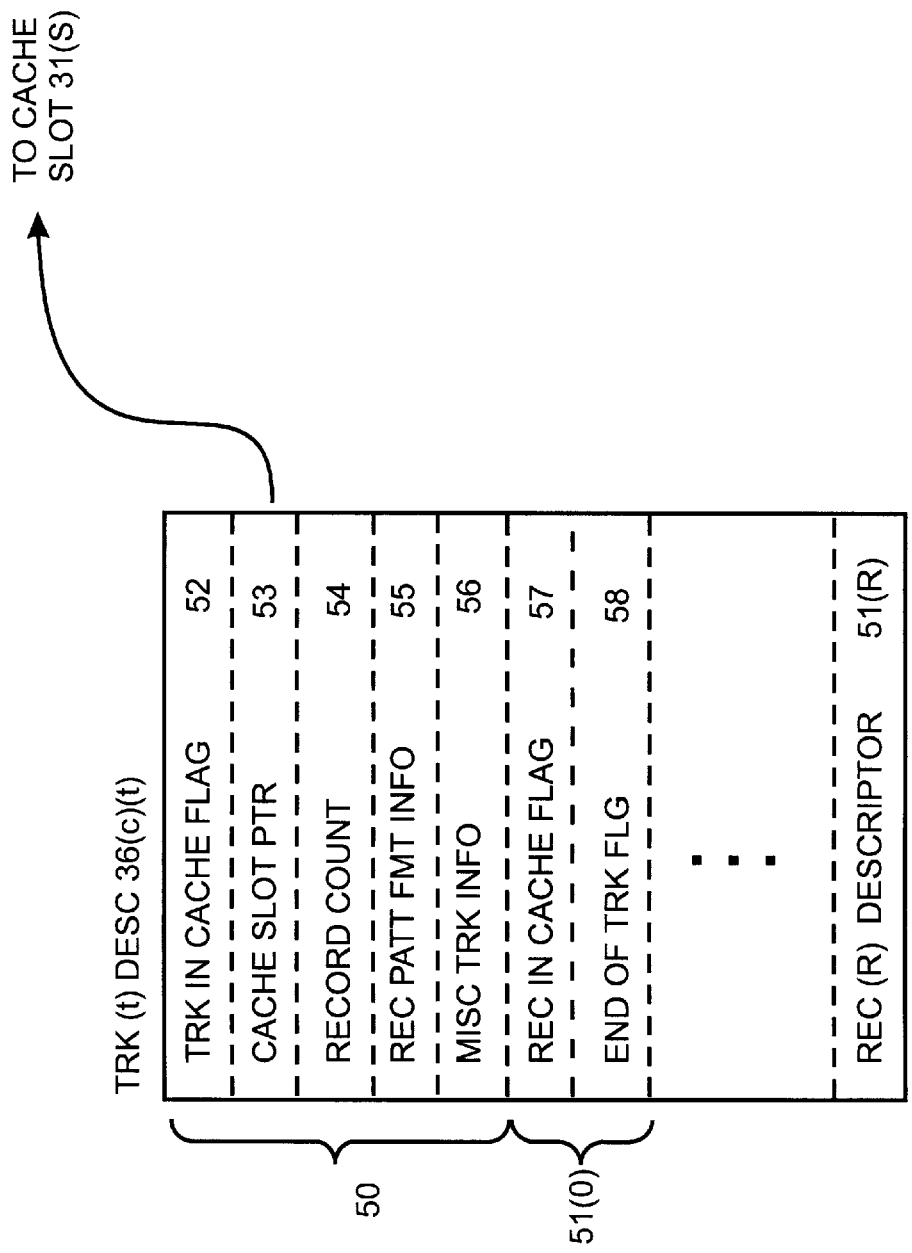
FIGS. 3A and 3B depict details of data structures which are useful in connection with the invention.

Before proceeding further, it would be helpful to describe details of a cache slot 31(s) and a track descriptor 36(c)(t) used in one embodiment to accommodate the invention. Such details will be described in connection with FIGS. 3A and 3B. With reference to FIG. 3A, a track descriptor 36(c)(t) includes a number of fields comprising a header portion 50, and may also include a plurality of record descriptors 51(1) through 51(R) (generally identified by reference numeral 51(r)). Generally, the header portion 50 contains information concerning the format and status of the track that is associated with the descriptor 36(c)(t), in particular indicating whether the track is the current owner of the cache slot 31(s). If the track is the current owner of the cache slot 31(s) or one of a predetermined number of prior owners of the cache slot 31(s), at least some whose records may still be in the cache slot 31(s) and available to a host adapter 24(n), the header portion 50 further includes a pointer to the particular cache slot 31(s). In addition, if the track is the current owner of the cache slot 31(s), the record descriptors 51(r) identify which of the particular ones of the records from the track are stored in the cache slot 31(s).

More specifically, the header portion 50 comprises a plurality of fields, including a track in cache flag 52, a cache slot pointer 53, a record count field 54, a record pattern format information field 55, and a miscellaneous track information field 56. The first three fields, namely, the track in cache flag 52, and a cache slot pointer 53 provide information as to the cached status of the track associated with the track descriptor 36(c)(t). The track in cache flag 52, when set, indicates that the track is the current owner of the cache slot 31(s). If the track associated with the track descriptor 36(c)(t) is the current owner of the cache slot or one of a predetermined number of previous owners at least some of whose records may still be in the cache memory 31, the cache slot pointer 53 points to the cache slot 31(s) for which the track associated with the track descriptor 36(c)(t) is the current owner, or one of the predetermined number of prior owners. If the track in cache flag 52 is empty, or if it contains a null value, the track associated with the track descriptor 36(c)(t) is neither the current owner nor one of a predetermined number of prior owners of a cache slot 31(s).

Two other fields in header portion 50, namely, the record count field 54 and the record pattern format information field 55, are used to identify the number and structures of the records which are stored on the track associated with the track descriptor 36(c)(t). In particular, the record count field 54 identifies the number of records on the track. The record pattern format information field 55 identifies the structure of the records, from which can be determined, for each record the starting point of the record(such as the displacement from the start of the track) and the length of the record. In one particular embodiment, the records are in the form of conventional CKD records, and, in that embodiment, the record pattern format information in field 55 identifies the format of the CKD records as stored in the respective track. In response to a stage request for a particular record, the storage controller 21(m) associated with the storage device which contains the track in which the record is stored can use the record pattern format information in field 55 to identify the location of the record on the track. Since each record is cached in the cache slot 31(s) in a location corresponding to its location in the track, the storage controller 21(m) can also use the information in the record pattern information field 55 to identify the particular location in the cache slot 31(s) to place the record. Similarly, when the host adapter 24(n) attempts to retrieve contents of a record cached in a cache slot 31(s), it (that is, the host adapter 24(n), can use the information in the record pattern information field 55 to identify the location of the record in the cache slot 31(s).

The miscellaneous track information field 67 can contain miscellaneous information concerning the track associated with the track descriptor 36(c)(t).

If the track associated with the track descriptor 36(c)(t) is the current owner of a cache slot, each record descriptor 51(r) in the track descriptor identifies the cached status of the respective "r-th" record on the track. That is, if the track associated with descriptor 36(c)(t) is the current owner of the cache slot 31(s) pointed to by cache slot pointer 53, the "r-th" record descriptor 51(r) indicates whether the "r-th" record on the track is cached in the cache slot 31(s). Each record descriptor 51(r) in the track descriptor 36(c)(t) contains two fields, namely, a record in cache flag 57 and an end of track flag 58. The record in cache flag 57, if set, indicates that the record associated with the record descriptor 51(r) is cached in the cache slot 31(s). On the other hand, if the record in cache slot 57 is not set, the record associated with the record descriptor 51(r) is not cached in the cache slot 31(s). The end of track flag 58, if set, indicates that the record associated with the record descriptor 51(r) is the last record on the track. If the end of track flag 58 is not set, the record associated with the record descriptor 51(r) is not the last record on the track. When a track becomes a new owner of a cache slot 31(s), it resets the record in cache flag 58 in all of the record descriptors 51(r) of the track descriptor 36(c)(t) associated with the previous owner of the track.

Figure 3B:
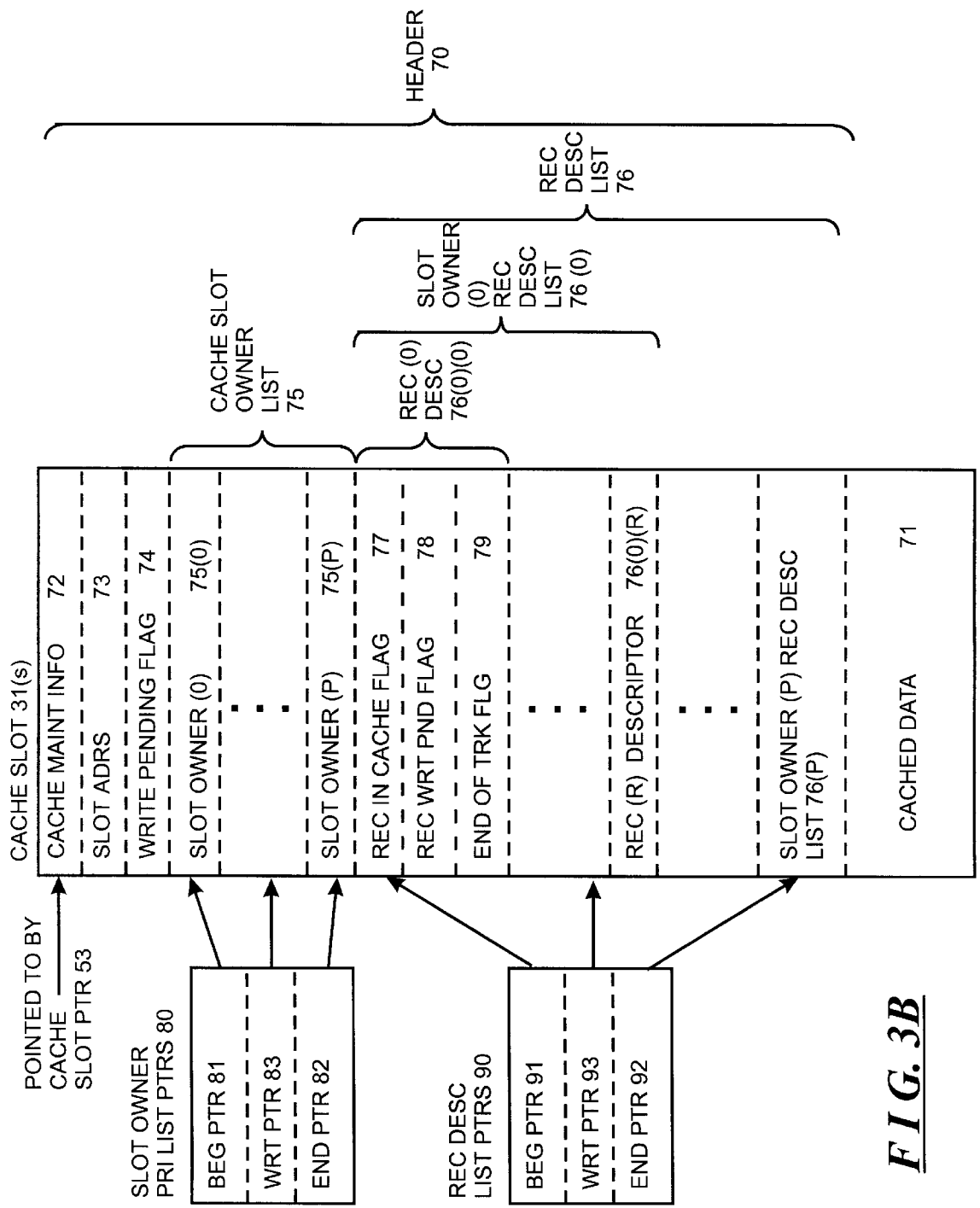

As shown in FIG. 3B, the cache slot 31(s) comprises a header portion 70 and a cached data portion 71. Generally, the cached data portion 71 contains the records from the current owner and predetermined number of prior owners that are cached in the cache slot 31(s). The header portion 70 generally contains information concerning the cache slot 31(s), including information used to maintain the ordering of the cache slots in connection with the cache slot replacement algorithm selected for the cache memory 31, the identification of the current owner and predetermined number of prior owners of the cache slot 31(s), information as to the records of the current owner and prior owners which are cached in the cache slot 31(s), and information as to whether any of the records which are cached in the cache slot 31(s) for the current owner have been updated, in which case a destaging operation will need to be performed for the updated records before the cache slot can be reused for a subsequent owner.

More specifically, the cache slot's header portion 70 includes a cache maintenance information field 72, a slot address field 73, a write pending field 74, a cache slot owner priority list 75 and a record descriptor list 76. The cache maintenance information field 72 contains information used in connection with the particular cache slot replacement algorithm which is selected for the cache memory 31. For example, if a least-recently-used cache slot replacement algorithm is used for the cache memory 31, the cache maintenance information field 72 will be used to link the cache slots 31(s) in the cache memory 31 in a doubly-linked list of cache slots, effectively linking the cache slots in an order corresponding to that in which they were most recently accessed by a storage controller 21(m) or host adapter 24(n). The slot address field 73 identifies the address of the cache slot 31(s) in the cache memory 31. The write pending flag 74, if set, indicates that at least one record from the current owner track which is cached in the cached data field 71 has been updated, and that a de-staging operation is required for the updated record. If the write pending flag 74 is not set, no record from the current owner of the cache slot 31(s) has been updated, and so no de-staging operation will be required. It will be appreciated that, if the write pending flag 74 is set, as described above, the cache slot 31(s) will be removed from the cache slots 31(s) which may be available for re-use in connection with the cache replacement algorithm selected for the cache memory 31, and in that case the cache maintenance information field 72 will be linked to the pending write list as described above. After the de-staging operation, the write pending flag 74 will be cleared and the cache maintenance information field 72 updated to return the cache slot 31(s) to the list of cache slots 31(s) which are available for re-use.

The cache slot owner priority list 75 identifies the track that is the current owner of the cache slot 31(s) and the series of track which previously owned the cache slot 31(s). The cache slot owner priority list 75 includes a plurality of cache slot owner priority fields 75(0) through 75(P) ((generally identified by reference numeral 75(p)). The number "P+1" of cache slot owner priority fields 75(p) corresponds to one plus the predetermined number of prior owners of the cache slot 31(s) whose records may be accessible in the cache slot 31(s) (the "one" corresponding to the current owner of the cache slot 31(s)). The fields 75(p) of the cache slot owner priority list 75 forms a circular table, defined by a slot owner priority list pointers table 80. Table 80, in turn, includes a plurality of fields, each containing a pointer, including (i) a field 81 which contains pointer which points to the first field 75(0) of the cache slot owner priority list 75, (ii) a field 82 which contains a pointer which points to the last field 75(P) of the cache slot owner priority list 75, and (iii) a field 83 which contains a pointer which points to the field 75(p) of the cache slot owner priority list 75 which contains the identification of the current owner of the cache slot 31(s). When a track becomes a new owner of the cache slot 31(s), the pointer in field 83 of table 80 is advanced, modulo "P," to point to the next field 75($p_t$) of the cache slot owner priority list 75, into which the identification of the track will be stored. Accordingly, it will be appreciated that the tracks identified by fields 75($p_t$-1), 75($p_t$-2), . . . , 75($p_t$-P) [($p_t$-1), ($p_t$-2), . . . , ($p_t$-P) being determined modulo "P"] define the order in which the tracks were prior owners of the cache slot 31(s)

The record descriptor list 76 contains information similar to that described above in connection with record descriptors 51(r) of the track descriptors 36(c)(t) for the respective records of the track that is the current owner and predetermined number of prior owners of the cache slot 31(s). In addition, the record descriptor list 76 indicates, for the current owner, whether a record cached in the cache slot 31(s) has been updated and will need to be de-staged. The record descriptor list 76 contains a plurality of slot owner record descriptor lists 76(0) through 76(P) (generally identified by reference numeral 76(p)) which is organized in a circular table similar to the cache slot owner list 75. The circular table defining the record descriptor list is defined by a record descriptor list pointer table 90 which includes a plurality of fields, each containing a pointer, including (i) a field 91 which contains pointer which points to the first slot owner record descriptor list 76(0) of the record descriptor list 76, (ii) a field 92 which contains a pointer which points to the last slot owner record descriptor list 76(0) of the record descriptor list 76, and (iii) a field 93 which contains a pointer which points to the slot owner record descriptor list 76(p) of the current owner of the cache slot 31(s). When a track becomes a new owner of the cache slot 31(s), the pointer in field 93 of table 90 is advanced, modulo "P," to point to the next slot owner record descriptor list 76($p_t$). It will be appreciated that the slot owner record descriptor lists 76($p_t$-1), 76($p_t$-2), . . . , 76($p_t$-P) [($p_t$-1), ($p_t$-2), . . . , $p_t$-P) being determined modulo "P"] are associated with successive prior owners of the cache slot 31(s).

Each slot owner record descriptor list 76(p) in the record descriptor list 76 includes one or more record descriptors 76(p)(0) through 76(p)(R) (generally identified by reference numeral 76(p)(r)) each associated with one of the records in the track associated with the descriptor list 76(p). Each record descriptor 76(p)(r), in turn, comprises a plurality of fields, including a record in cache flag 77, a record write pending flag 78 and an end of track flag 79. The record in cache flag 77 and end of track flag 79 provide information similar to that provided by the correspondingly-named flags 60 and 61 of the record descriptor 51(r) of track descriptor 36(c)(t). The record write pending flag 78 of record descriptor 76(r), if set, indicates that the record associated with the descriptor 76(r), namely, the "r-th" record on the track which is the current owner, has been updated and will need to be de-staged. In one embodiment, only the record or records in the cache slot 31(s) from the current owner of the cache slot can be updated in the cache slot 31(s).

Figure 4:
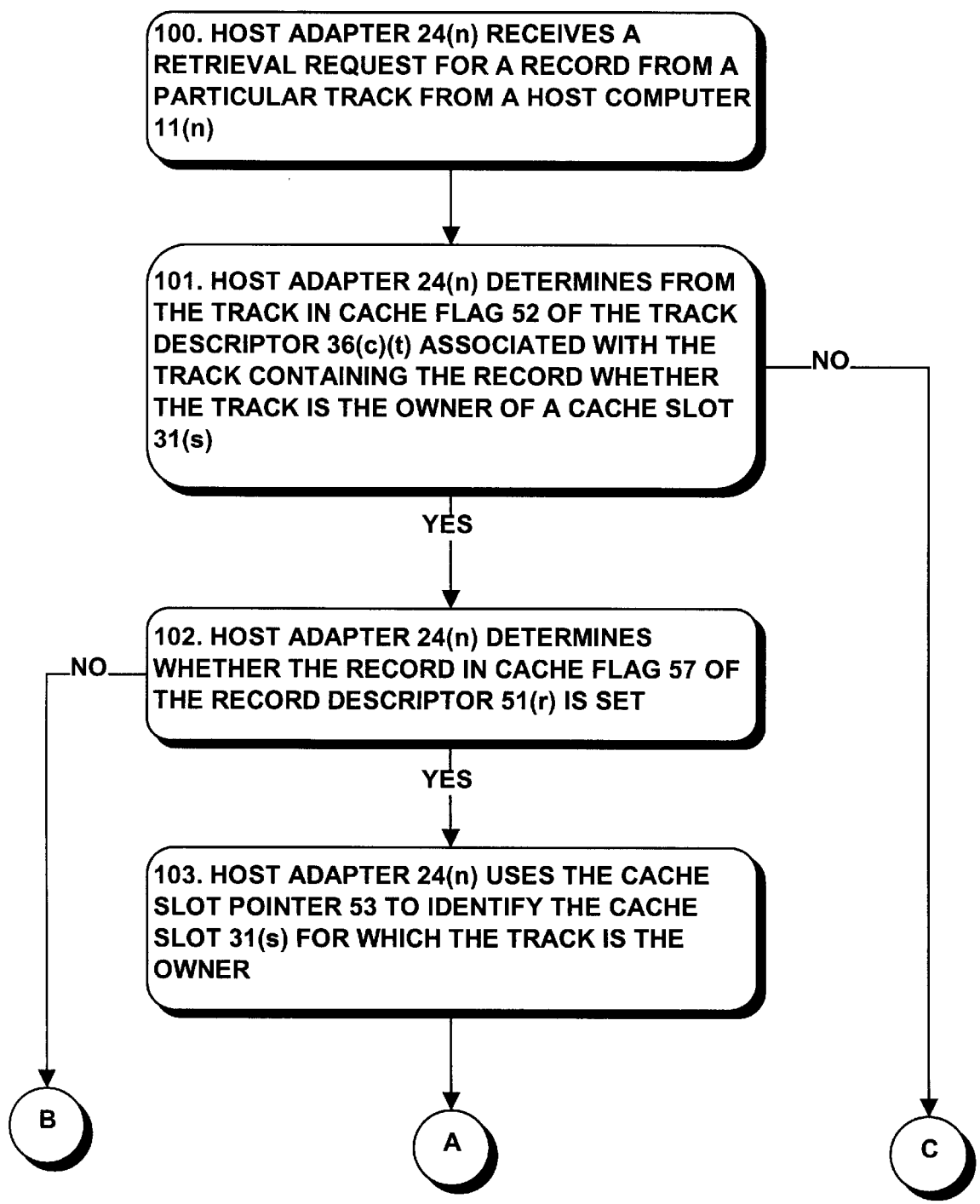
FIGS. 4 through 7A are flow-charts illustrating the operations performed by the mass storage subsystem depicted in FIGS. 1 through 3.
Figure 4B:
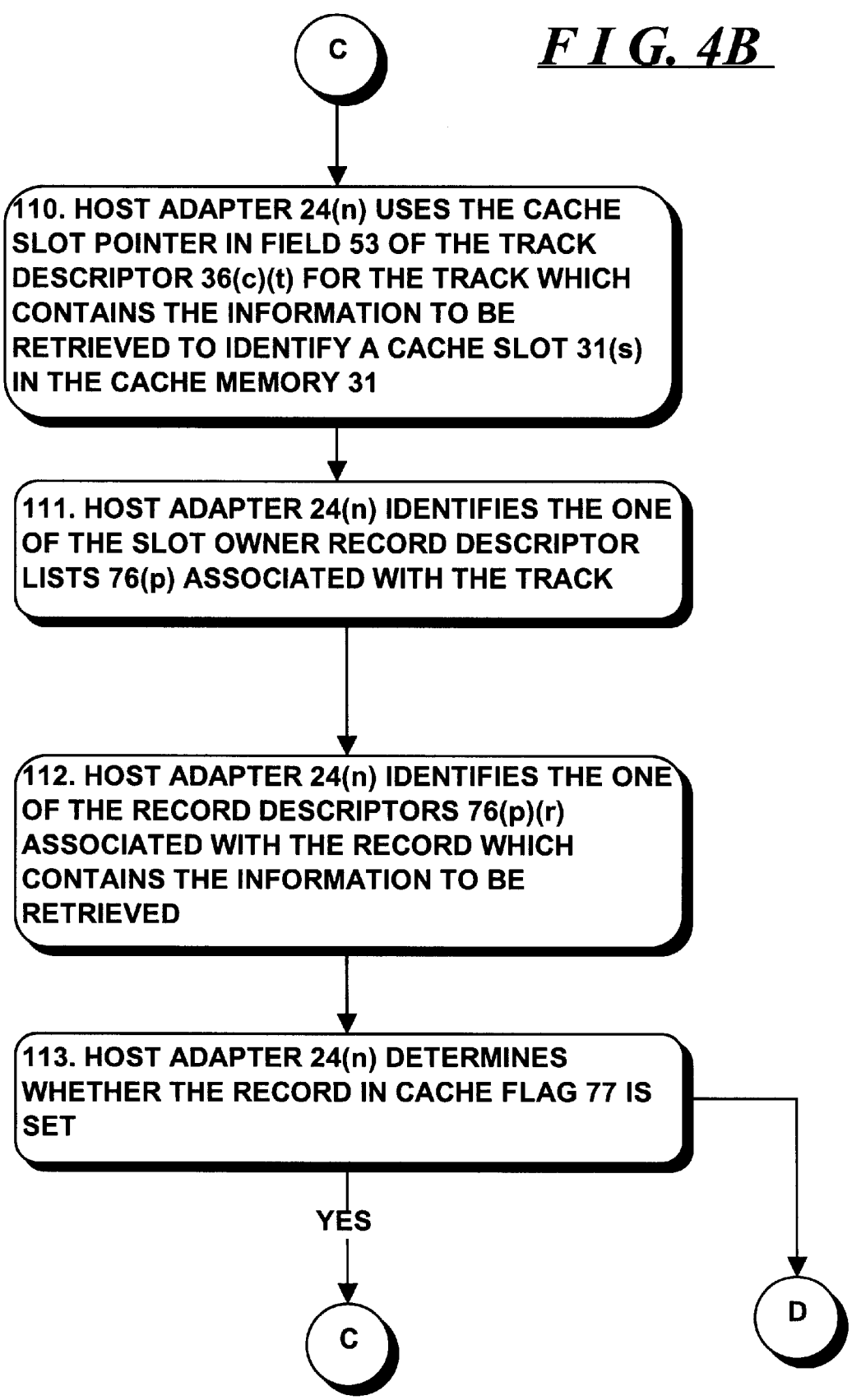
Figure 4C:
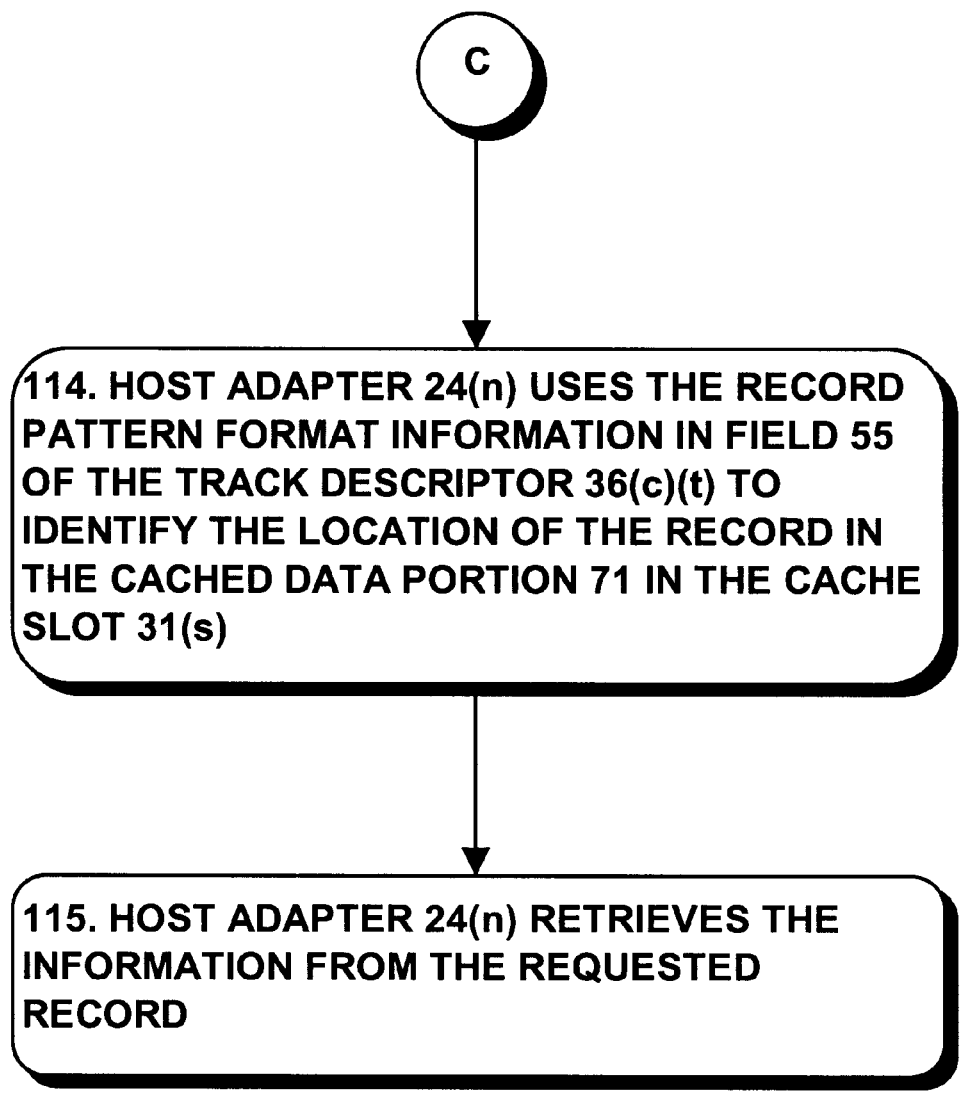
Figure 5:
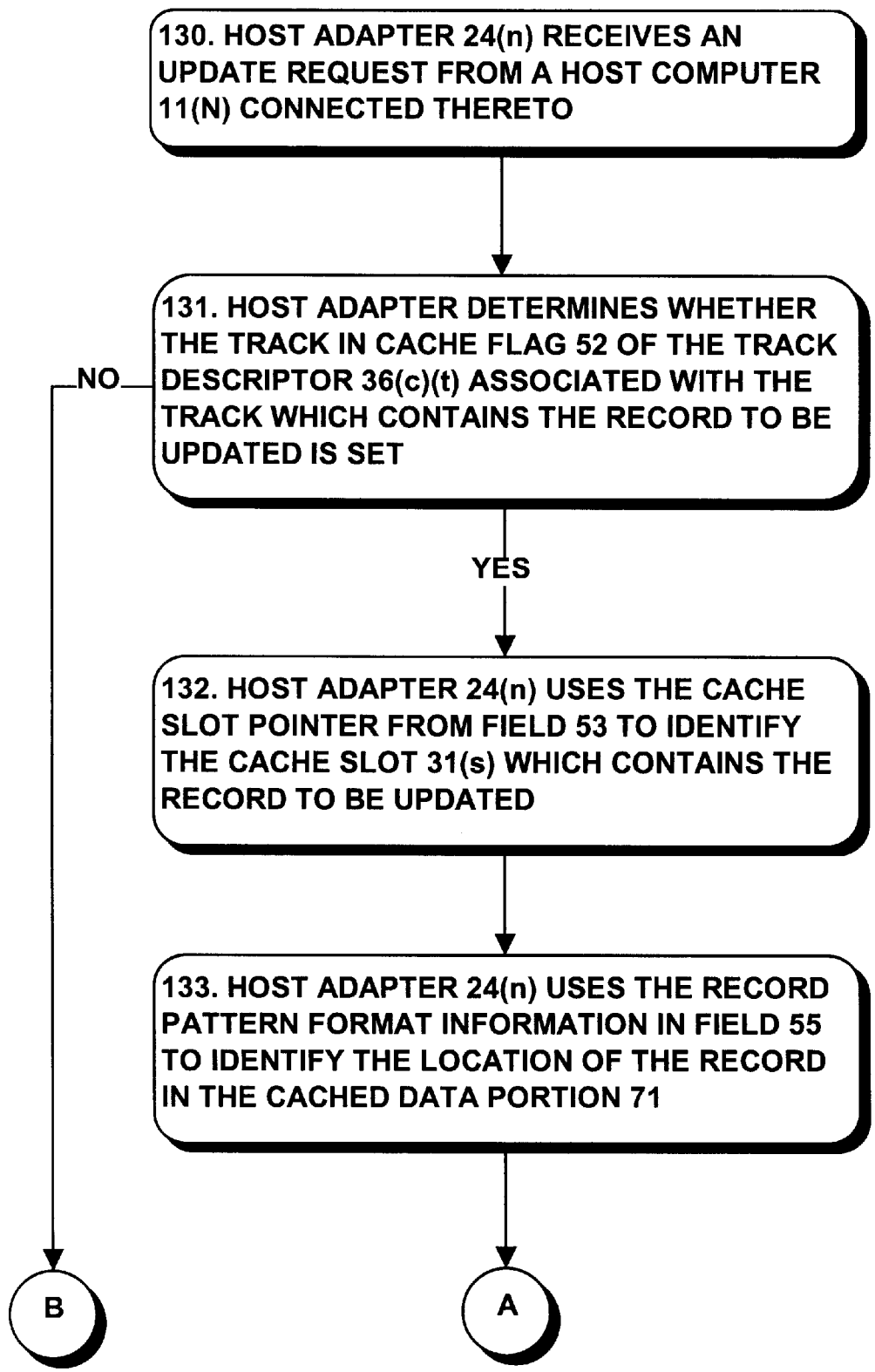
Figure 5A:
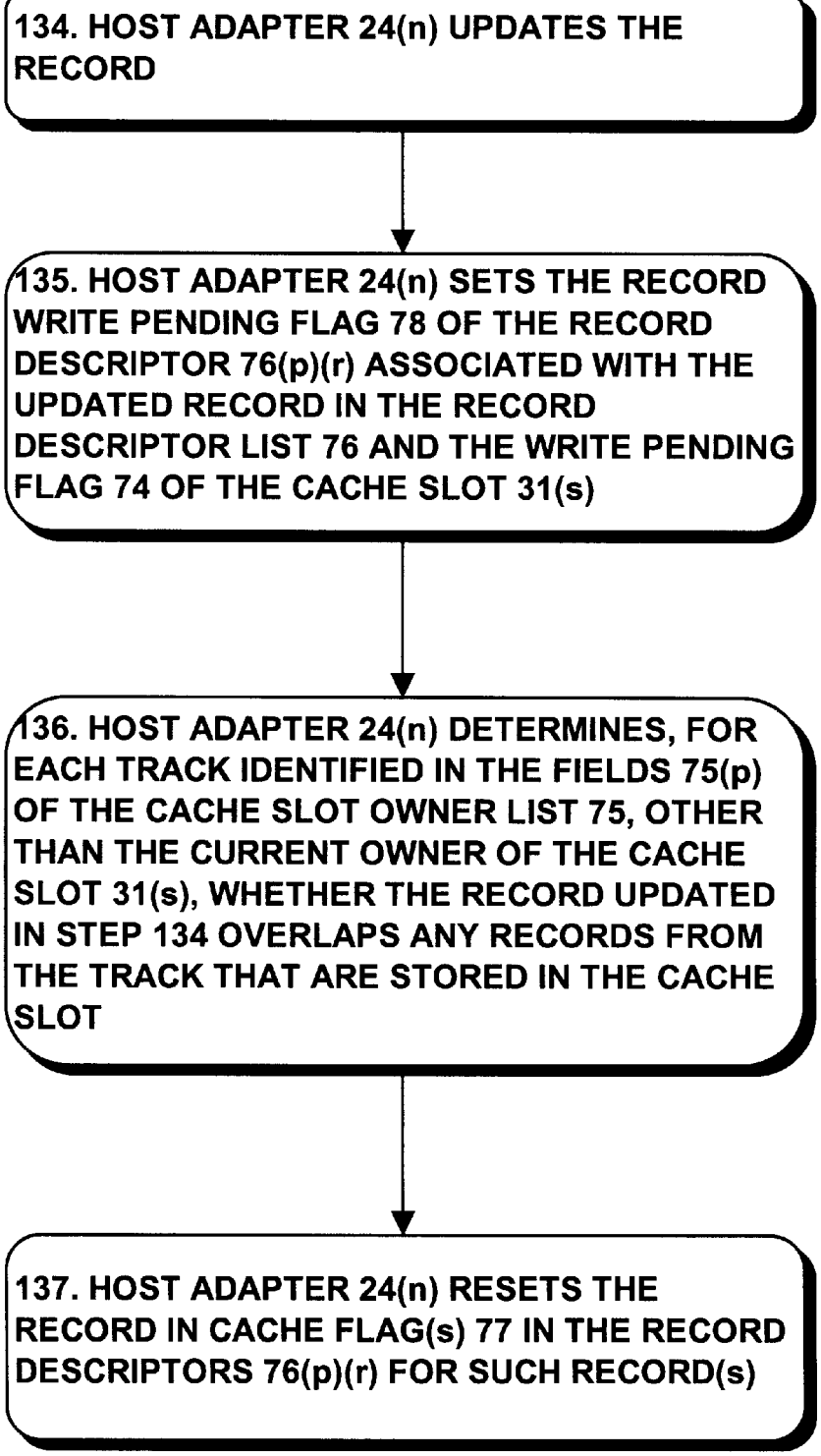
Figure 5B:
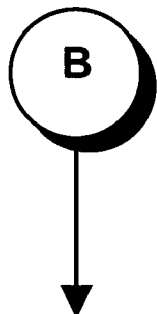
Figure 6:
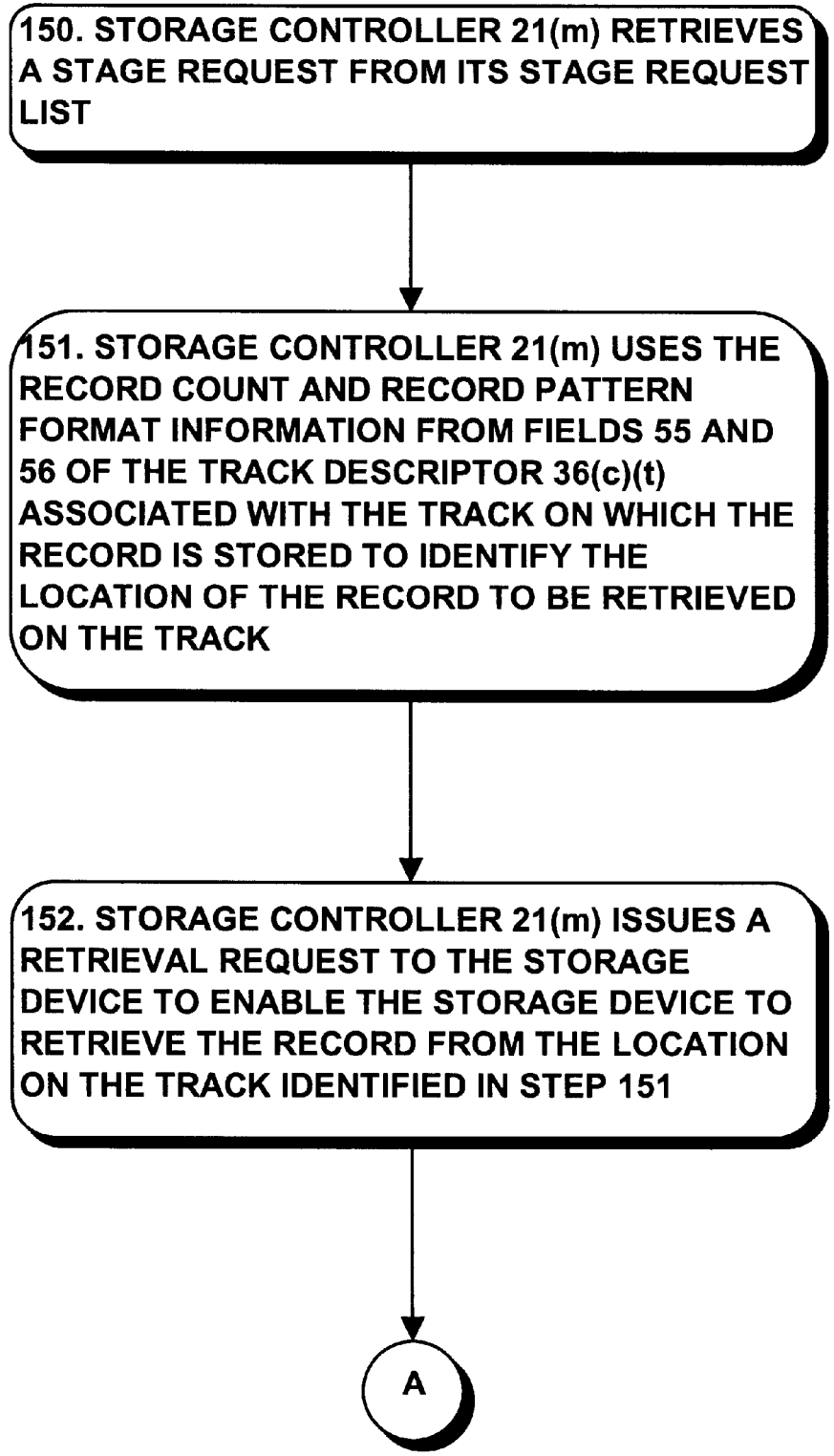
Figure 6A:
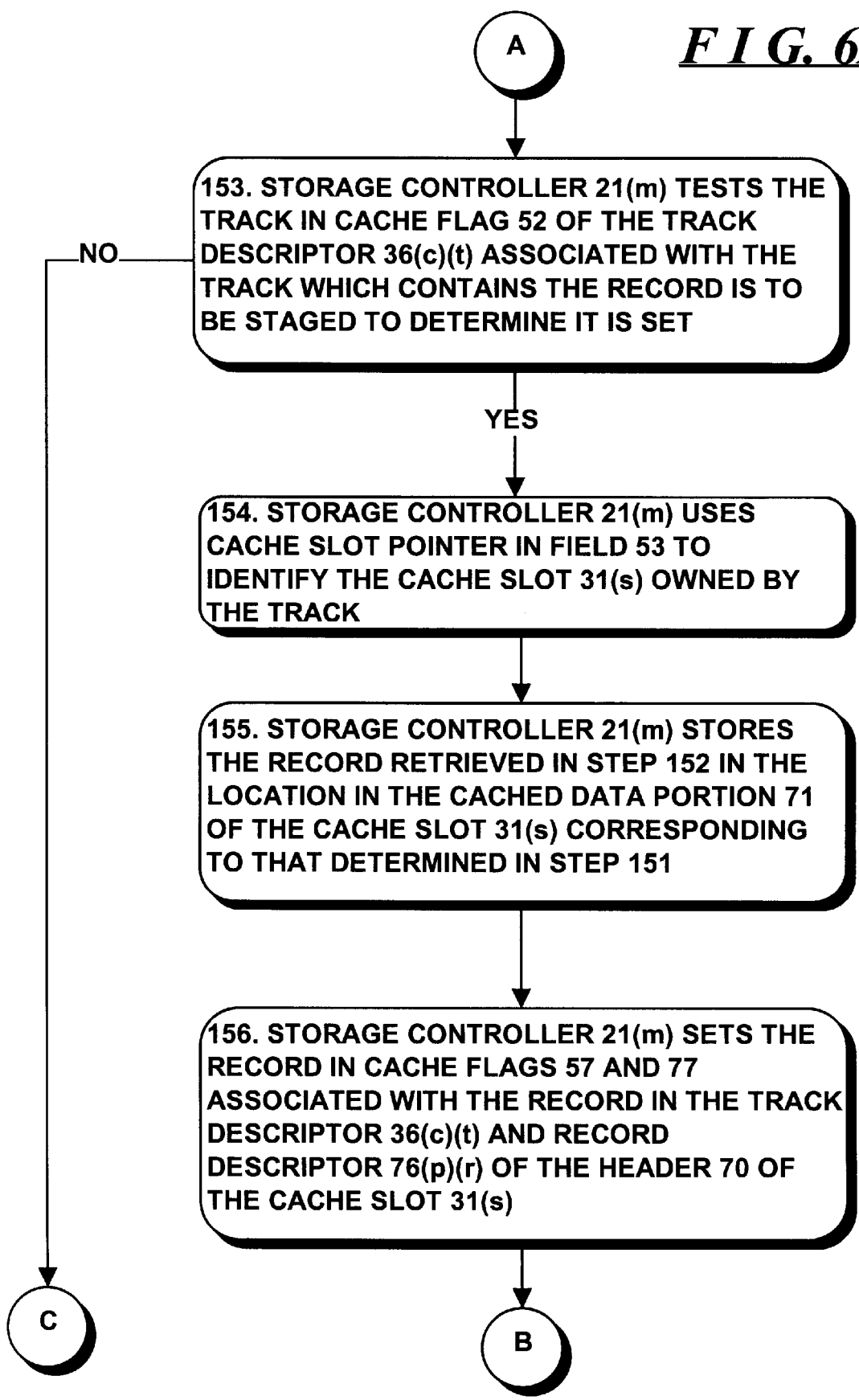
Figure 6B:
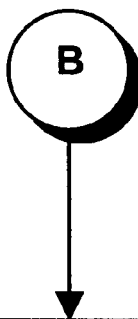
Figure 6C:
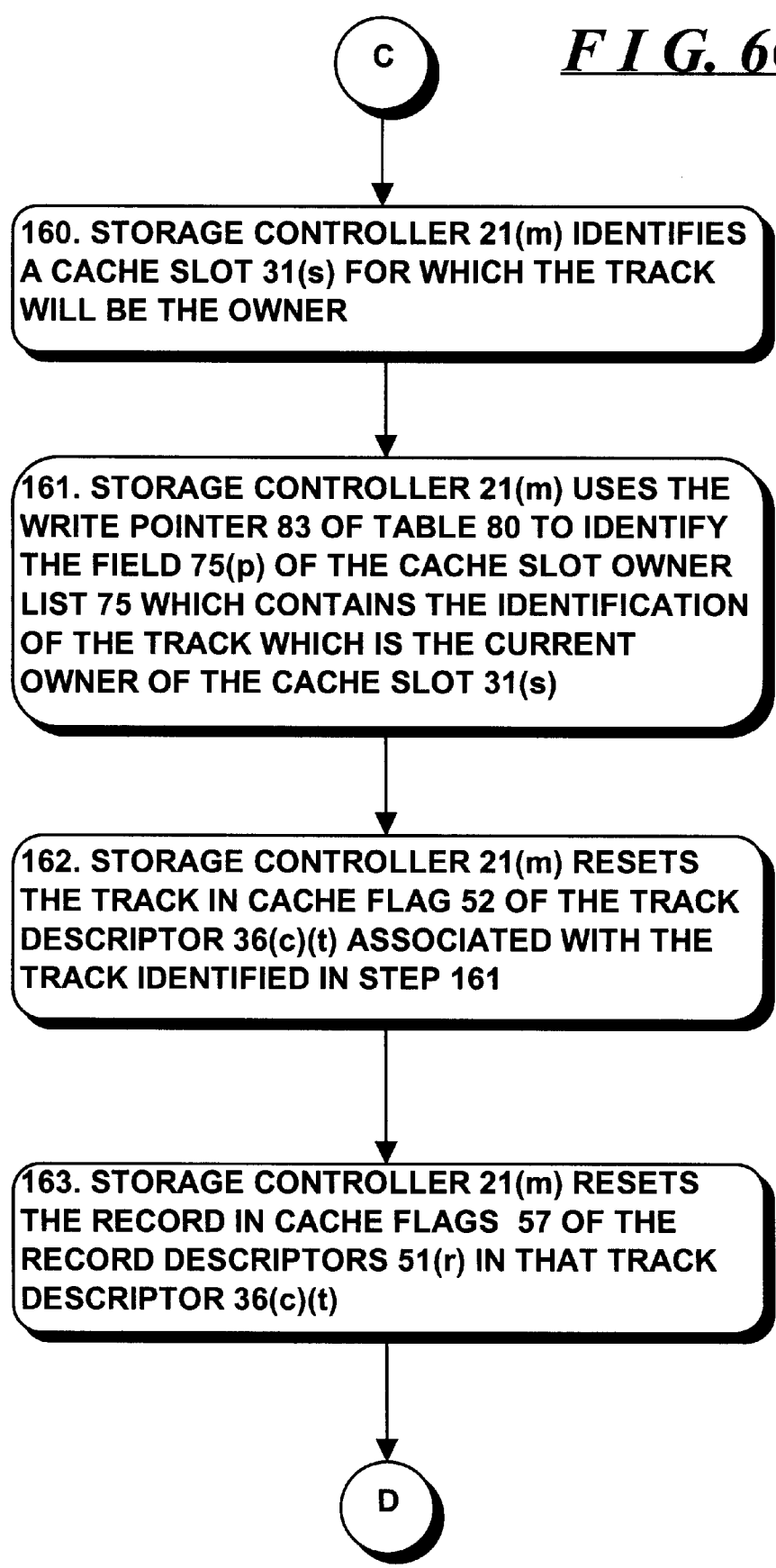
Figure 7:
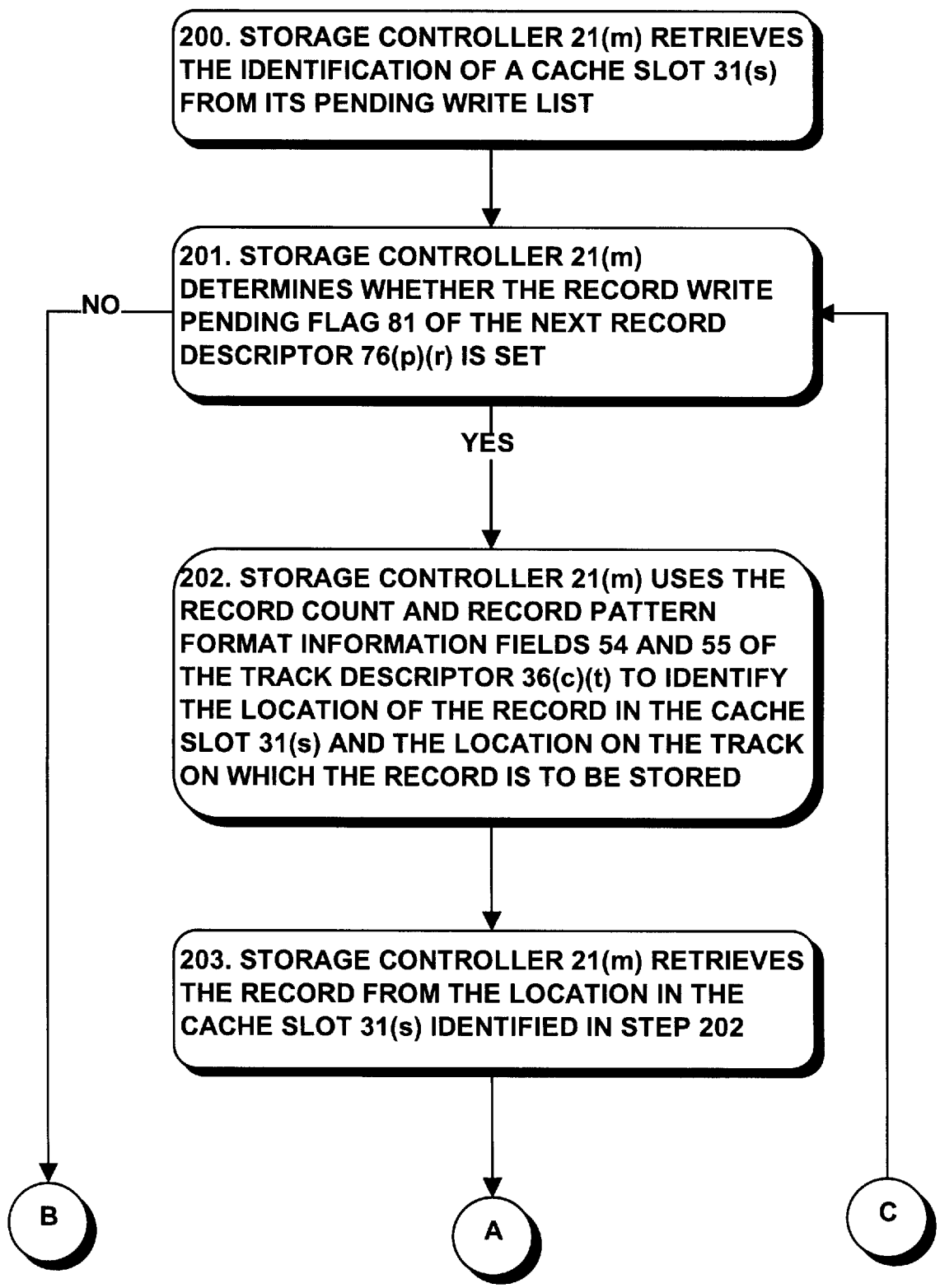
Figure 7A:
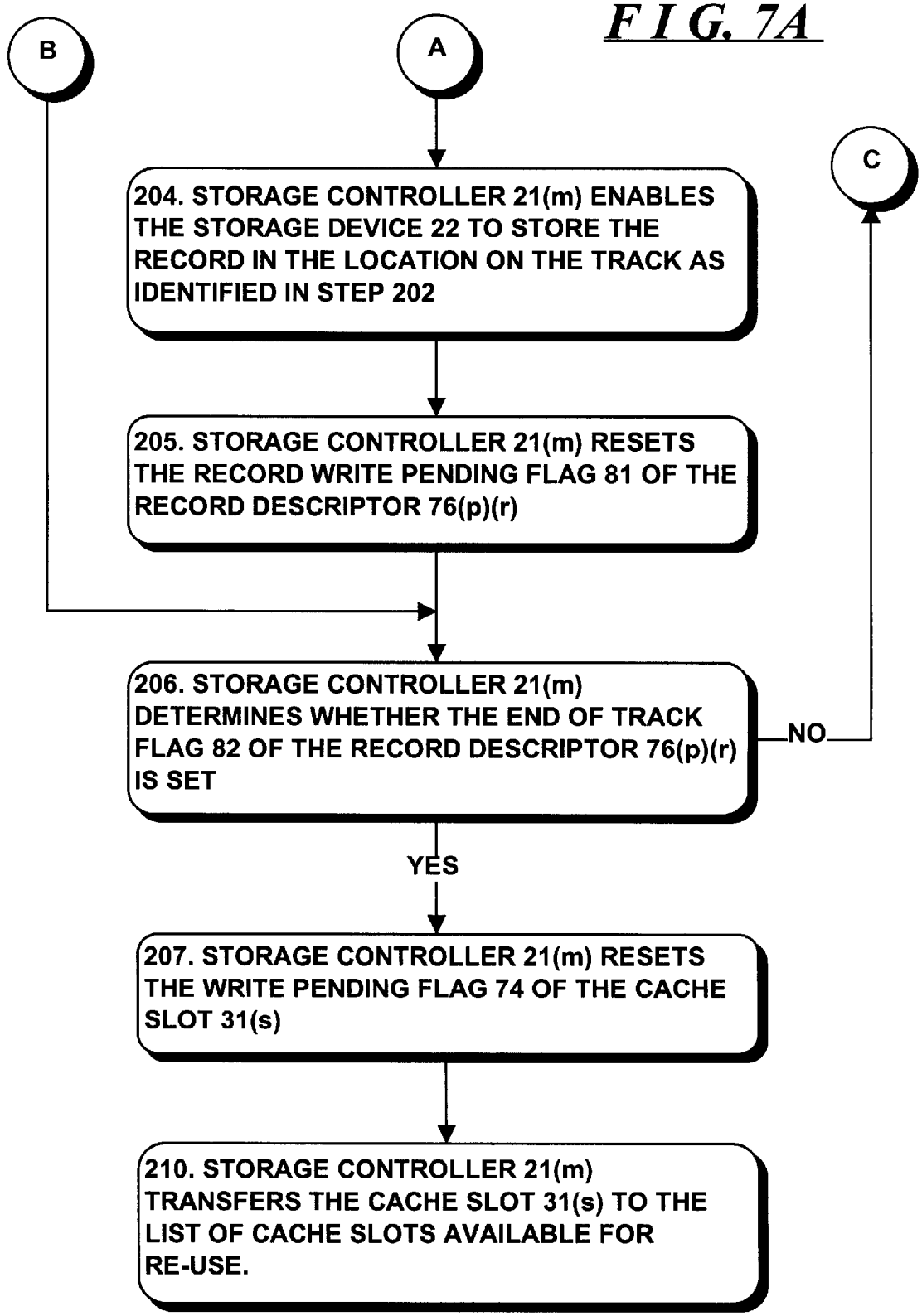

The operations performed by a host adapter 24(n) and a storage controller 21(m) in connection with the invention will be described in detail in connection with the flow-chart in FIGS. 4 through 7. FIG. 4 depicts operations performed by a host adapter 24(n) in connection with a retrieval operation, FIG. 5 depicts operations performed by the host adapter in connection with a storage operation, FIG. 6 depicts operations performed by a storage controller 21(m) in connection with a staging operation, and FIG. 7 depicts operations performed by a storage controller 21(m) in connection with a de-staging operation.

With reference initially to FIG. 4, when the host adapter 24(n) receives a retrieval request for a record from a particular track from a host computer 11(n) (step 100), it will initially perform a number of steps to determine whether the record is in the cache memory 31. First, it will determine from the track in cache flag 52 of the track descriptor 36(c)(t) associated with the track containing the record whether the track is the owner of a cache slot 31(s) (step 101). As described above, if the track is the owner of a cache slot, the record descriptors 51(r) of the track descriptor 36(c)(t) will indicate whether the record has been staged and is in a cache slot 31(s). Accordingly, if the host adapter 24(n) makes a positive determination in step 101, it will determine whether the record in cache flag 57 of the record descriptor 51(r) is set (step 102). If the host adapter 24(n) makes a positive determination i step 102, it will use the cache slot pointer 53 to identify the cache slot 31(s) for which the track is the owner (step 103), and the record pattern format information in field 55 to identify the location of the record in the cached data portion 71 in the cache slot 31(s) (step 104) and retrieve the information from the requested record (step 105).

Returning to step 102, if the host adapter 24(n) makes a negative determination in that step, the track is the owner of the cache slot, but the record from which information is to be retrieved has not been staged and thus is not in the cache slot 31(s). In that case, the host adapter 24(n) will generate a stage request for the record and load it into the stage request list (not shown) for the storage controller 21(m) associated with the storage device 22 which contains the track (step 106).

Returning to step 101, if the host adapter determines in that step that the track in cache flag 52 of the track descriptor 36(c)(t) associated with the track containing the record indicates that the track is not the owner of a cache slot 31(s), it will then determine from the track descriptor 36(c)(t) associated with the track containing the record whether the cache slot pointer 53 contains a null value (step 107). As described above, if the cache slot pointer 53 does not contain a null value, the value in the cache slot pointer 53 is a pointer that points to the cache slot 31(s) for which the track is one of the predetermined number of prior owners; on the other hand, if the cache slot pointer 53 contains a null value, then there is no cache slot 31(s) for which the track containing the record is the current owner or one of the predetermined number of prior owners. Accordingly, if the host adapter 24(n) makes a positive determination in step 107, that is, if it determines that the cache slot pointer 53 contains a null value, then it will sequence to step 106 to generate a stage request for the record, and load it on the stage request list (not shown) for the storage controller 21(m) which is associated with the storage device 22 which contains the record.

On the other hand, if the host adapter 24(n) makes a negative determination in step 107, that is, if it determines that the cache slot pointer 53 does not contain a null value, indicating that the track is one of a predetermined number of prior owners of a cache slot whose records may be retrievable from a cache slot 31(s), the host adapter 24(n) performs a series of steps to determine whether the record to be retrieved is in the cache slot 31(s). First, the host adapter 24(n) uses the cache slot pointer in field 53 of the track descriptor 36(c)(t) for the track which contains the information to be retrieved to identify a cache slot 31(s) in the cache memory 31 (step 110), and thereafter to identify the one of the slot owner record descriptor lists 76(p) associated with the track (step 111). In performing step 111, the host adapter 24(n) can determine the one of the fields 75(p) of the cache slot owner list 75 which identifies the track which contains the information to be retrieved, since the index "p" of the field 75(p) of the cache slot owner list 75 which identifies the track which contains the information to be retrieved is the same as the index "p" of the slot owner record descriptor list 76(p) of the record descriptor list 76 which contains the record descriptors 76(p)(r) for the track. After determining the index "p," the host adapter 24(n) can use that index to identify the slot owner record descriptor list 76(p) which contains the descriptor associated with the track from which the information is to be retrieved.

After identifying in step 111 the slot owner record descriptor list 76(p) for the track that contains the information to be retrieved, the host adapter 24(n) identifies the one of the record descriptors 76(p)(r) associated with the record which contains the information to be retrieved (step 112) and determines whether the record in cache flag 77 is set (step 113). If the host adapter 24(n) determines in step 113 that the record in cache flag 77 is set, the record is in the cache slot 31(s), and so it (that is, the host adapter 24(n)) will use the record pattern format information in field 55 of the track descriptor 36(c)(t) to identify the location of the record in the cached data portion 71 in the cache slot 31(s) (step 114) and retrieve the information from the requested record (step 115). On the other hand, if the host adapter 24(n) determines in step 113 that the record in cache flag 77 is not set, it (that is, the host adapter 24(n)) will sequence to step 106 to generate a stage request for the record and load it into the stage request list (not shown) for the storage controller 21(m) associated with the storage device 22 which contains the track.

FIG. 5 depicts operations performed by the host adapter 24(n) in connection with a storage operation, in which a record is updated. With reference to FIG. 5, the host adapter 24(n) initially receives an update request from a host computer 11(n) connected thereto (step 130). As described above, the host adapter 24(n) will only update a record if the track which contains the record to be updated is the owner of a cache slot 31(s) and the record to be updated has been staged into the cache slot, and so the host adapter 24(n) will perform operations to determine this. Initially, the host adapter will determine whether the track in cache flag 52 of the track descriptor 36(c)(t) associated with the track which contains the record to be updated is set (step 131). As described above, if the track in cache flag 36(c)(t) is set, the track is the owner of the cache slot 31(s) pointed to by the cache slot pointer 53 of the track descriptor 36(c)(t).

If the host adapter 24(n) makes a positive determination in step 131, it will use the cache slot pointer from field 53 to identify the cache slot 31(s) which contains the record to be updated (step 132) and the record pattern format information in field 55 to identify the location of the record in the cached data portion 71 (step 133) and update the record (step 134). Thereafter, the host adapter 24(n) will set the record write pending flag 78 of the record descriptor 76(p)(r) associated with the updated record in the record descriptor list 76, and will also set the write pending flag 74 of the cache slot 31(s) (step 135).

In addition, the host adapter 24(n) will determine, for each track identified in the fields 75(p) of the cache slot owner list 75, other than the current owner of the cache slot 31(s), whether the record updated in step 134 overlaps any records from the track that are stored in the cache slot (step 136) and, if so, it (that is, the host adapter 24(n)) will reset the record in cache flag(s) 77 in the record descriptors 76(p)(r) for such record(s) (step 137). It will be appreciated that the host adapter 24(n) can use the write pointer 83 to identify which field 75(p$_o$) of the cache slot owner list 75 contains the identification of the current owner of the cache slot 31(s), and not perform step 137 in connection with that field 75(p$_o$). To determine whether any of the records of the tracks identified in fields 75(p) (p≠p$_o$) are overlapped by the record updated in step 134, the host adapter 24(n) will use the record pattern format information in fields 55 of the track descriptors 36(c)(t) associated with the tracks identified in the fields 75(p)(p≠p$_o$) of the cache slot owner list 75.

Returning to step 131, if the host adapter 24(n) makes a negative determination in that step, that is, if it determines that the track in cache flag 52 of the track descriptor 36(c)(t) whose track contains the record to be updated is not the owner of a cache slot 31(s), it (that is, the host adapter 24(n)) will sequence to step 138 to generate a stage request for the record and load it into the stage request list (not shown) for the storage controller 21(m) associated with the storage device 22 which contains the track.

FIG. 6 depicts operations performed by a storage controller 21(m) in connection with a staging operation. With reference to FIG. 6, during a staging operation, the storage controller 21(m) will initially retrieve a stage request from its stage request list (step 150). The stage request includes the identification of the track and record to be staged, with the identification of the track including the identification of a particular storage device 22, cylinder and read/write head thereby to uniquely identify the track. The storage controller 21(m) will use the record count and record pattern format information from fields 55 and 56 of the track descriptor 36(c)(t) associated with the track on which the record is stored to identify the location of the record to be retrieved on the track (step 151) and will thereafter issue a retrieval request to the storage device to enable the storage device to retrieve the record from the location on the track identified in step 171 (step 152).

In addition, the storage controller 21(m) will test the track in cache flag 52 of the track descriptor 36(c)(t) associated with the track which contains the record is to be staged to determine whether the track is the owner of a cache slot 31(s) in the cache memory 31 (step 153). If the storage controller 21(m) makes a positive determination in step 153, that is, if the track which contains the record to be staged is the owner of a cache slot 31(s), it will use cache slot pointer in field 53 to identify the cache slot 31(s) owned by the track (step 154), and store the record retrieved in step 152 in the location in the cached data portion 71 of the cache slot 31(s) corresponding to that determined in step 151 (step 155), so that the location in the cached data portion 71 in which the record is stored will correspond to the location of the record as recorded on the track. Thereafter, the storage controller 21(m) will set the record in cache flags 57 and 77 associated with the record in the track descriptor 36(c)(t) and record descriptor 76(p)(r) of the header 70 of the cache slot 31(s) (step 156)

In addition, the storage controller 21(m) will determine, for each track identified in the fields 75(p) of the cache slot owner list 75, other than the current owner of the cache slot 31(s), whether the record stored in step 155 overlaps any records from the track that are stored in the cache slot (step 157) and, if so, it (that is, the storage controller 21(m)) will reset the record in cache flag(s) 77 in the record descriptors 76(p)(r) for such record(s) (step 158). It will be appreciated that the storage controller 21(m) can use the write pointer 83 to identify which field 75(p$_o$) of the cache slot owner list 75 contains the identification of the current owner of the cache slot 31(s), and not perform step 157 in connection with that field 75(p$_o$). To determine whether any of the records of the tracks identified in fields 75(p) (p≠p$_o$) are overlapped by the record stored in step 155, the storage controller 21(m) will use the record pattern format information in fields 55 of the track descriptors 36(c)(t) associated with the tracks identified in the fields 75(p) (p≠p$_o$) of the cache slot owner list 75.

Returning to step 153, if the storage controller 21(m) makes a negative determination in that step, that is, if it determines that the track from which the record is to be staged is not the current owner of a cache slot 31(s), it (that is, the storage controller 21(m)) will perform a series of steps to make the track the current owner of a cache slot. In those operations, the storage controller 21(m) will initially identify a cache slot 31(s) for which the track will be the owner (step 160) and use the write pointer 83 of table 80 to identify the field 75(p) of the cache slot owner list 75 which contains the identification of the track which is the current owner of the cache slot 31(s) (step 161). Thereafter, the storage controller 21(m) will reset the track in cache flag 52 of the track descriptor 36(c)(t) associated with the track identified in step 161 (step 162) and reset the record in cache flags 57 of the record descriptors 51(r) in that track descriptor 36(c)(t) (step 163).

Following step 163, the storage controller 21(m) will advance the write pointers 83 and 83 of the tables 80 and 90 to point to the respective next field 75(p) and list 76(p) in the cache slot owner list 75 and record descriptor list 76 (step 164). Thereafter, the storage controller 21(m) will clear the cache slot pointer field 53 of the track descriptor 36(c)(t) associated with the track identified by the contents of the field 75(p) pointed to by the write pointer 83 (step 165), load an identifier identifying the track that is to be the new owner into the location identified by write pointer 83 (step 166) and establish a slot owner record descriptor list 76(p) for the track in the location in the record descriptor list 76 identified by write pointer 93 (step 167). In addition, the storage controller 21(m) will, in the track descriptor 36(c)(t) associated with the track which is the new owner of the cache slot 31(s), set the track in cache flag 52 (step 168) and load a pointer to the cache slot 31(s) into the field 53 (step 169). Thereafter, the storage controller 21(m) will sequence to step 155 to store the record in the cache slot 31(s), condition the record in cache flags 57 and 77 of the record descriptors 51(r) and 76(p)(r) of the respective track descriptor 36(c)(t) and record descriptor list 76 associated with the record, and condition the record in cache flag(s) of records associated with prior owners which overlap the newly-stored record in the cache slot 31(s) as described above.

FIG. 7 depicts operations performed by a storage controller 21(m) in connection with a destaging operation, during which records in a cache slot 31(s) which have been updated are stored on the storage device 22 which contains the track for which the cache slot 31(s) is the owner. The storage controller 21(m) will obtain the identification of cache slots 31(s) which contain updated records from its pending write list. Accordingly, the storage controller 21(m) will initially retrieve the identification of a cache slot 31(s) from its pending write list (step 200) and determine whether the record write pending flag 78 of the first record descriptor 76(p)(0) of the slot owner record descriptor list 76(p) pointed to by the write pointer 93 of table 90 is set (step 201). If the storage controller 21(m) makes a positive determination in step 201, that is, if it determines that the record write pending flag 78 is set, it (that is, the storage controller 21(m)) will use the record count and record pattern format information fields 55 and 56 of the track descriptor 36(c)(t) to identify the location of the record in the cache slot 31(s) and the location on the track on which the record is to be stored (step 202), retrieve the record from the location in the cache slot 31(s) identified in step 202 (step 203) and enable the storage device 22 to store the record in the location on the track as identified in step 202 (step 204). Thereafter, the storage controller 21(m) will reset the record write pending flag 78 of the record descriptor 76(p)(0) (step 205).

Returning to step 201, if the storage controller 21(m) makes a negative determination in that step, that is, if it determines that the record write pending flag 78 of the first record descriptor 76(0) is not set, the record has not been updated and so it (that is, the storage controller 21(m) has not been updated. Accordingly, following step 205, or step 201 if the storage controller 21(m) makes a negative determination in that step, the storage controller 21(m) will determine whether the end of track flag 79 of the record descriptor 76(p)(0) is set (step 206). If the end of track flag 79 of the record descriptor is not set (which will be the case if the track contains more than one record), the storage controller 21(m) will return to step 201 to perform the operations described above in connection with steps 201 through 206 in connection with the next record descriptor 76(p)(1).

The storage controller 21(m) will repeat steps 201 through 206 for successive record descriptors 76(p)(r) until it determines in step 206 that the end of track flag 79 of a record descriptor 76(p)(r) is set. When that occurs, record descriptors 76(r) associated with all of the records in the track will have been processed, in which case the storage controller 21(m) can reset the write pending flag 74 of the cache slot 31(s) (step 207) and transfer the cache slot 31(s) to the list of cache slots available for re-use (step 210).

The invention provides a number of advantages. In particular, it provides an arrangement which can reduce the number of relatively lengthy staging operations which may need to be performed by the storage subsystem 12 for records to be retrieved by a host adapter 24(1).

It will be appreciated that a number of modifications may be made to the record-level caching system as described above. For example, although the system has been described as being directed to storage subsystems in which information is stored in the form of CKD records, it will be appreciated that the invention can be advantageously used in connection with storage subsystems in which information is stored in fixed blocks, using so-called "fixed block architecture," in which the blocks are generally the same size. In that such subsystems, since the blocks have the same size, generally the track descriptors 36(c)(t) need not provide record pattern format information (reference field 56, FIG. 3A)). In addition, if all of the tracks have the same number of blocks, the track descriptors 36(c)(t) need not provide count information such as that provided by the record count field 54. Furthermore, it will be appreciate that, in determining whether a block updated or staged in a cache slot in the cache memory 31 overlaps blocks in the cache slot 31(s) for previous cache slot owners (reference steps 136 and 157), the host adapter 24(n) and storage controller 21(m) need only determine whether the updated or staged block has the same offset from the beginning of the track as any which may have been stored in the cache slot 31(s) for previous cache slot owners.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A digital data storage subsystem comprising:
   A. a cache memory comprising at least one cache slot for storing data;
   B. a digital data store comprising:
      i. a plurality of data storage sections each for storing digital data records, and
      ii. a storage controller for identifying, for said at least one cache slot, one of said data storage sections as constituting a current owner of said at least one cache slot, said storage controller being responsive to record staging requests to selectively transfer records from the data storage section identified as the owner of said at least one cache slot to said cache slot for caching; and
   C. a host adapter responsive to access requests requesting access to a said record, the host adapter accessing the record for which said access request requests access if the record is from either the cache slot which is identified as the current owner or at least one previous owner and if the record is in that cache slot.

2. A digital data storage subsystem as defined in claim 1 in which said cache memory comprises a plurality of cache slots, said storage controller identifying for at least some of said cache slots a respective one of said data storage sections as a respective current owner.

3. A digital data storage subsystem as defined in claim 1 in which said digital data store includes a disk drive in which digital data is stored on a plurality of tracks, each of said data storage sections comprising one of said tracks.

4. A digital data storage subsystem as defined in claim 3 in which at least one track stores digital data in the form of variable length records.

5. A digital data storage subsystem as defined in claim 4 in which each said variable-length record is in CKD format.

6. A digital data storage subsystem as defined in claim 3 in which at least one track stores digital data in the form of fixed-length records.

7. A digital data storage subsystem as defined in claim 6 in which each said fixed length record comprises a block.

8. A digital data storage subsystem as defined in claim 1 in which said host adapter accesses the record for which said access request requests access if the record is from the cache slot which is identified as the current owner or one of a predetermined number of previous owners of the cache slot and if the record is in the cache slot, and otherwise generates a said record staging request for processing by said storage controller.

9. A digital data storage subsystem as defined in claim 8 in which:

A. said cache memory comprises a plurality of cache slots;

B. each of said digital data sections has an associated section descriptor, said section descriptor including a pointer to one of said cache slots if the section is the current owner of said cache slot or one of said predetermined number of previous owners of the cache slot; and C. said host adapter, during an access operation in connection with a record associated with a section, uses the section descriptor to identify one of said cache slots for which the section is either the current owner or one of said predetermined number of previous owners, if any.

10. A digital data storage subsystem as defined in claim 9 in which each said section descriptor further includes a current ownership flag, the storage controller conditioning the current ownership flag to a current owner state when the associated section is current owner of a said cache slot, and to a non-owner state when the associated section is not current owner of a said cache slot.

11. A digital data storage subsystem as defined in claim 9 in which each said cache slot includes a header, the header identifying the sections comprising the current owner of the cache slot and the ones of the predetermined number of previous owners of the cache slot, the storage controller updating the header when it identifies a current owner of the cache slot.

12. A digital data storage subsystem as defined in claim 11 in which the header for each cache slot further includes, for each of the current owner and the ones of the predetermined number of previous owners of the respective cache slot, a record descriptor list including a plurality of record descriptors each associated with a record associated with the current owner and the ones of the predetermined number of previous owners of the respective cache slot, each record descriptor having a record in cache flag indicating whether the associated record is present in the cache slot, the storage controller updating a record in cache flag associated with an overwritten one of said records in the cache slot during a transfer of a said record from the data storage section identified as a cache slot owner to the respective cache slot for caching.

13. A digital data storage subsystem as defined in claim 12 in which said storage controller further updates the record in cache flag for the record transferred from the data storage section identified as the cache slot owner to the respective cache slot thereby to indicate that the record is in the cache.

14. A digital data storage subsystem as defined in claim 12 in which the host adapter, in response to an access request, if the record is associated with the current owner and the ones of the predetermined number of previous owners of a respective cache slot, determines from the record in cache flag of the record descriptor associated with the record in the header of the respective cache slot whether the record is in the cache slot, and, if so, accesses the record in the cache slot.

15. A digital data storage subsystem as defined in claim 14 in which each section descriptor further includes record pattern format information, the host adapter when accessing a said record further using the record pattern format information in the section descriptor for the section associated with the record to be accessed to determine in connection with the record access.

16. A digital data storage subsystem as defined in claim 14 in which each said section descriptor further includes a record descriptor associated with each record associated with the respective section, the storage controller conditioning the section descriptor's record descriptor associated with a record transferred from the data storage section identified as a cache slot owner to the respective cache slot for caching to indicate that the associated record is in the cache slot.

17. A digital data storage subsystem as defined in claim 16 in which, when a storage controller identifies a new current owner associated with one of said cache slots, the storage controller resets any said record descriptors associated with the next-previous owner associated with said one of said cache slots.

18. A storage controller for use in a digital data storage subsystem including a cache memory comprising a plurality of cache slots each for storing data and a plurality of data storage sections each for storing digital data records, each said cache slot having an associated header identifying a current owner for the cache slot and a predetermined number of previous owners and records associated with the current owner and said predetermined number of previous owners whose records are in the cache slot, the storage controller comprising:

A. a record stage request receiver for receiving a stage request identifying a record to be transferred from said data storage section to said cache memory for caching;

B. a cache slot ownership identifier for, if the section associated with the identified record is not a current owner of one of said cache slots, identifying one of said cache slots for which the section associated with the identified record is to be the current owner;

C. a record transfer element for transferring the record identified in the stage request to the identified cache slot for caching; and D. a header update element for updating the header to indicate that the transferred record is in the cache slot and that any records associated with previous owners overwritten by the transferred record are not in the cache slot.

19. A host adapter for use in a digital data storage subsystem including a cache memory comprising at least one cache slot for storing data and a plurality of data storage sections each for storing digital data records, said at least one cache slot having an associated header identifying a current owner for the cache slot and a predetermined number of previous owners and records associated with the current owner and said predetermined number of previous owners whose records are in the at least one cache slot, the host adapter comprising:

A. a record access receiver for receiving a record access request identifying a record to be accessed;

B. a record access element for accessing the record for which said access request requests access if the record is from either the at least one cache slot which is identified as the current owner or at least one previous owner and if the record is in the at least one cache slot.

20. A host adapter as defined in claim 19 in which the a record access element, if the record is not in the at least one cache slot, generates a record staging request to enable said record to be transferred to said at least one cache slot.

21. A method of operating a digital data storage subsystem including a cache memory comprising at least one cache slot for storing data and a plurality of data storage sections each for storing digital data records, said at least one cache slot having an associated header identifying a current owner for the cache slot and a predetermined number of previous owners and records associated with the current owner and said predetermined number of previous owners whose records are in the at least one cache slot, the method comprising the steps of:

A. responsive to access requests requesting access to a said record, accessing the record for which said access request requests access if the record is from either the at least one cache slot which is identified as the current owner or at least one previous owner and if the record is in the at least one cache slot, and otherwise generating a record staging request; and B. processing the record staging request by:
  i. identifying for said at least one cache slot, one of said data storage sections as constituting a current owner of said at least one cache slot, said
  ii. selectively transferring records from the data storage section identified as the owner of said at least one cache slot to said cache slot for caching.

22. A method of operating a digital data storage subsystem including a cache memory comprising a plurality of cache slots each for storing data and a plurality of data storage sections each for storing digital data records, each said cache slot having an associated header identifying a current owner for the cache slot and a predetermined number of previous owners and records associated with the current owner and said predetermined number of previous owners whose records are in the cache slot, the method comprising the steps of:

A. receiving a stage request identifying a record to be transferred from said data storage section to said cache memory for caching;

B. if the section associated with the identified record is not a current owner of one of said cache slots, identifying one of said cache slots for which the section associated with the identified record is to be the current owner;

C. transferring the record identified in the stage request to the identified cache slot for caching; and D. updating the header to indicate that the transferred record is in the cache slot and that any records associated with previous owners overwritten by the transferred record are not in the cache slot.

23. A method of operating a digital data storage subsystem including a cache memory comprising at least one cache slot for storing data and a plurality of data storage sections each for storing digital data records, said at least one cache slot having an associated header identifying a current owner for the cache slot and a predetermined number of previous owners and records associated with the current owner and said predetermined number of previous owners whose records are in the at least one cache slot, the method comprising the steps of:

A. receiving a record access request identifying a record to be accessed; and

B. accessing the record for which said access request requests access if the record is from either the at least one cache slot which is identified as the current owner or at least one previous owner and if the record is in the at least one cache slot.

24. A method as defined in claim 23 further comprising the step of, if the record is not in the at least one cache slot, generating a record staging request to enable said record to be transferred to one of said cache slots.

* * * * *